United States Patent
Jiang

(10) Patent No.: US 9,483,119 B2
(45) Date of Patent: Nov. 1, 2016

(54) STEREO INTERACTIVE METHOD, DISPLAY DEVICE, OPERATING STICK AND SYSTEM

(71) Applicant: SUPERD CO. LTD, Shenzhen, Guangdong (CN)

(72) Inventor: Lingfeng Jiang, Guangdong (CN)

(73) Assignee: SUPERD CO. LTD, Shenzhen, Guangdong (CN)

( * ) Notice: Subject to any disclaimer, the term of this patent is extended or adjusted under 35 U.S.C. 154(b) by 14 days.

(21) Appl. No.: 14/566,793

(22) Filed: Dec. 11, 2014

(65) Prior Publication Data

US 2015/0309575 A1    Oct. 29, 2015

(30) Foreign Application Priority Data

Apr. 29, 2014 (CN) .......................... 2014 1 0179098

(51) Int. Cl.
| | |
|---|---|
| G06F 3/01 | (2006.01) |
| G06F 3/0346 | (2013.01) |
| G06F 3/0481 | (2013.01) |
| G06F 3/0488 | (2013.01) |
| G06F 3/0354 | (2013.01) |

(52) U.S. Cl.
CPC ............ *G06F 3/016* (2013.01); *G06F 3/0346* (2013.01); *G06F 3/03545* (2013.01); *G06F 3/0488* (2013.01); *G06F 3/04815* (2013.01)

(58) Field of Classification Search
CPC ...... G06F 3/016; G06F 3/017; G06F 3/0346; G06F 3/04815; G06F 3/03545; G06F 3/0416
See application file for complete search history.

(56) References Cited

U.S. PATENT DOCUMENTS

| 2004/0043368 A1* | 3/2004 | Hsieh ..................... G09B 23/28 434/262 |
|---|---|---|
| 2010/0073360 A1* | 3/2010 | Huang ..................... G06F 3/016 345/419 |
| 2012/0295709 A1* | 11/2012 | Adhikari ............. G06F 3/03545 463/37 |

FOREIGN PATENT DOCUMENTS

CN          202142008 U          2/2012

* cited by examiner

*Primary Examiner* — Premal Patel
(74) *Attorney, Agent, or Firm* — Andrew C. Cheng

(57) ABSTRACT

The present invention relates to a stereo interactive method adapted for an interactive scene of a stereo display device and a stereo interactive operating stick. The method includes: obtaining motion trajectory information of the operating stick; calculating invasion degree information of an invasion that the operating stick applies to a virtual object displayed by the display device according to motion trajectory information and preset property information of the virtual object; calculating interaction feedback information according to motion trajectory information, invasion degree information and the preset property information; and controlling the operating stick and the virtual object to make responses matched with the preset property of the virtual object according to the interaction feedback information. The present further provides stereo interactive display device, operating stick and system. When using the operating stick to interact with the virtual object, real operation tactile can be experienced by the user of operation.

18 Claims, 10 Drawing Sheets

STEREO INTERACTIVE METHOD, DISPLAY DEVICE, OPERATING STICK AND SYSTEM

TECHNICAL FIELD

The present invention relates to the field of stereoscopic display technology, and particularly to a stereo interactive method, a stereo interactive display device, a stereo interactive operating stick and a stereo interactive system.

DESCRIPTION OF RELATED ART

In the stereoscopic display technology, human-machine interaction is no longer limited to two-dimensional space. In order to pursue reality, three-dimensional interactions must be closely combined with visual effects. At present, interactions with stereoscopically-displayed virtual objects primarily include xy plane translations and z-axis depth translations, but such interactions appeal to be lack of stereo feeling and real tactile impression.

SUMMARY

The present invention aims to at least solve one of existing technical problems of prior art or related art.

Accordingly, an objective of the present invention is to provide a stereo interactive method.

Another objective of the present invention is to provide a stereo interactive display device.

Still another objective of the present invention is to provide a stereo interactive operating stick.

Even still another objective of the present invention is to provide a stereo interactive system.

In order to achieve the above objectives, an embodiment according to a first aspect of the present invention provides a stereo interactive method adapted for an interactive scene of a stereo display device and a stereo interactive operating stick. The method includes: obtaining motion trajectory information of the stereo interactive operating stick; calculating invasion degree information of an invasion that the stereo interactive operating stick applies to a virtual object displayed by the display device according to the motion trajectory information and preset property information of the virtual object; calculating interaction feedback information according to the motion trajectory information, the invasion degree information and the preset property information; and controlling the stereo interactive operating stick and the virtual object to make responses matched with the preset property of the virtual object according to the interaction feedback information.

In this embodiment, since the virtual object is not real, the property of the virtual object can be set by program to denote the characteristics of the virtual object. The preset property of the virtual object can be type, harness, material, shape, etc., of the virtual object. An intersection degree of the stereo interactive operating stick and the virtual object can be determined according to the motion trajectory information, and then the invasion degree information of the stereo interactive operating stick applied to the virtual object can be determined. The invasion degree information can be information of the operation that the stereo interactive operating stick performs to the virtual object, such as squeezing degree information, invaded degree information or collision degree information. When the stereo interactive operating stick interacts with the display device, an interactive unit controls the stereo interactive operating stick and the virtual object to make responses matched with the preset property of the virtual object according to the motion trajectory information, the invasion degree information and the preset property information of the virtual object. The response of the stereo interactive operating stick may be for example that the stereo interactive operating stick generates a damping force to make the user to feel a resistance and/or generates pressure acting on the user's hand, so that the feeling of the user may be the same as that during operates a real object.

In addition, the stereo interactive method according to the above embodiment of the present invention may further have additional technical features as follows.

In the above technical solution, preferably, the step of obtaining motion trajectory information of the stereo interactive operating stick includes: obtaining the motion trajectory information of the stereo interactive operating stick according to information of a triggered button on the stereo interactive operating stick and gesture information of the stereo interactive operating stick; the step of calculating interaction feedback information according to the motion trajectory information, the invasion degree information and the preset property information includes: determining operation type information of an operation that the stereo interactive operating stick performs to the virtual object according to the invasion degree information, the motion trajectory information and the preset property information, and calculating the interaction feedback information according to the operation type information and the invasion degree information; and thereby controlling the stereo interactive operating stick to make the response matched with the operation type and the preset property of the virtual object according to the interaction feedback information.

After the motion trajectory of the stereo interactive operating stick is obtained, by combining the preset property information of the virtual object, the invaded degree of the virtual object can be acknowledged. According to the invasion degree information, the motion trajectory information and the preset property information of the virtual object, the operation type of an operation of performing can be acknowledged, and then the invasion degree information corresponding to the operation type, such as invaded length information, squeezed degree information or moved distance information can be obtained. Based on the preset property information of the virtual object designed in current scene and currently-obtained invasion degree information and motion trajectory information, the current operation type can be determined and the information for controlling the stereo interactive operating stick to make a matched response can be calculated, i.e., the interaction feedback information is determined. Since the virtual object may be visually inside the screen or outside the screen, the conversion of calculated interaction feedback information is required according to different scenes, so as to meet the current scene and meanwhile allow the user to experience the real tactile impression.

In any one of the above technical solutions, preferably, when the preset property of the virtual object is an elastic object with certain hardness, the invasion degree information is squeezing degree information of the virtual object being squeezed, the operation type information is squeezing type information; the interaction feedback information calculated according to the squeezing degree information, the preset property information of the virtual object and the squeezing type information includes damping force information and/or force feedback intensity information; when the squeezed virtual object is visually outside the screen, the force feedback intensity information is converted into a force feedback intensity control signal which is output to a force feedback unit of the stereo interactive operating stick to thereby control the stereo interactive operating stick to make a response matched with the operation type and the preset property of the virtual object; or when the squeezed virtual object is visually inside the screen, the damping force information and the force feedback intensity information respectively are converted into a damping force control signal which is output to a damping generation unit of the stereo interactive operating stick and a force feedback intensity control signal which is output to a force feedback unit of the stereo interactive operating stick, to thereby control the stereo interactive operating stick to make a response matched with the operation type and the preset property of the virtual object.

In a typical scene, the stereo interactive operating stick tests the hardness of the virtual object. In this scene, the virtual object is designed to be an elastic object with certain hardness. When the stereo interactive operating stick performs an operation to the virtual object, the virtual object can be squeezed by the stereo interactive operating stick, corresponding interaction feedback information for example damping force information and/or force feedback intensity information (it is assumed that the stereo interactive operating stick includes a damping generation unit and a force feedback unit, the damping generation unit is for producing a damping force according to a damping force control signal converted from the damping force information, the force feedback unit is for producing a force feedback intensity according to a force feedback intensity control signal converted from the force feedback intensity information) can be determined according to squeezing degree information, preset property information of the virtual object and squeezing type information.

When the virtual object being visually outside the screen is squeezed, since a telescopic portion of the stereo interactive operating stick cannot telescope, it cannot use the damping generation unit to generate the damping force, and only can use the force feedback unit to generate the force feedback intensity. When the virtual object being visually inside the screen is squeezed, it is needed to generate damping force and force feedback intensity. In brief, the interaction feedback information is needed to be converted into corresponding control signal(s) according to different scenes. Accordingly, in this embodiment, the damping force information and/or force feedback intensity information converted from the interaction feedback information can control the damping generation unit and/or force feedback unit of the stereo interactive operating stick to perform corresponding operations, and the user can experience corresponding tactile impression, for example, when the damping generation unit generates a resisting force, the user can feel an elastic force during squeezing the virtual object, and when the force feedback unit generates a pressure, the user also can feel the elastic force during squeezing the virtual object.

In any one of the above technical solutions, preferably, when the preset property of the virtual object is an elastic object with possible elastic collision, the invasion degree information is collision momentum information of the virtual object, and the operation type information is collision type information; when a collision being visually outside the screen occurs, the interaction feedback information is calculated according to the collision momentum information and the preset property information of the virtual object, the preset property information includes mass and hardness, the interaction feedback information includes force feedback intensity information and force feedback duration information, a force feedback intensity control signal is output to a force feedback unit of the stereo interactive operating stick to thereby control the stereo interactive operating stick to make a response matched with the operation type and the preset property of the virtual object; when a collision being visually inside the screen occurs, the interaction feedback information includes damping magnitude information, damping duration information and force feedback intensity information calculated according to the collision momentum information and preset mass and hardness of the virtual object, a damping force control signal is output to a damping generation unit of the stereo interactive operating stick and a force feedback intensity control signal is output to the force feedback unit to thereby control the stereo interactive operating stick to make a response matched with the operation type and the preset property of the virtual object.

Another typical scene is that the stereo interactive operating stick collides with a virtual object. According to collision momentum information and preset mass and hardness of the virtual object, force feedback intensity and duration or damping magnitude and damping duration ought to be exhibited by the stereo interactive operating stick can be determined, and then the user can experience the real collision of the stereo interactive operating stick with the virtual object.

In any one of the above technical solutions, preferably, when the preset property of the virtual object is an object with multi-level hardness, the invasion degree information is an invaded destructive length of the virtual object, and the operation type information is invasion destructive type information; the interaction feedback information is total damping force information corresponding to a current invaded length calculated according to corresponding relationships between preset hardness of each level and damping force; when the invaded virtual object is visually outside the screen, the total damping force information includes force feedback intensity information and force feedback duration information, the total damping force information is converted into a force feedback intensity control signal which is output to a force feedback unit of the stereo interactive operating stick to thereby control the stereo interactive operating stick to make a response matched with the operation type and the preset property of the virtual object; and when the invaded virtual object is visually inside the screen, the total damping force information is converted into a damping force control signal and a force feedback intensity control signal which respectively are output to a damping generation unit and a force feedback unit of the stereo interactive operating stick, to thereby control the stereo interactive operating stick to make a response matched with the operation type and the preset property of the virtual object.

In still another scene, the stereo interactive operating stick invades into a virtual object, such as cuts the virtual object. The interaction feedback information includes damping force information and force feedback intensity information calculated according to invaded length in the virtual object and hardness exhibited by the virtual object at different lengths. The interaction feedback information then is converted into a damping force control signal and a force feedback intensity control signal for the stereo interactive operating stick, and thereby the user can experience a real feeling of the stereo interactive operating stick cutting an object.

Preferably, the stereo interactive operating stick has a preset property, the virtual object makes a response matched with the preset property of the stereo interactive operating stick as well as the preset property of the virtual object according to the interaction feedback information and the preset property of the stereo interactive operating stick.

In any one of the above technical solutions, preferably, the virtual object makes a response matched with the operation type and the preset property of the virtual object. During the stereo interactive operating stick interacts with the stereo display device, the virtual object can make a response matched with current operation type and preset property of the virtual object, so that the user can visually feel the change of the virtual object.

An embodiment according to a second aspect of the present invention provides a stereo interactive display device adapted for interacting with a stereo interactive operating stick capable of generating information of triggered button and gesture information. The stereo interactive display device includes: a display unit configured (i.e., structured and arranged) for displaying a virtual object with preset property; and an interactive unit configured for interacting with the stereo interactive operating stick. The interactive unit is configured to obtain motion trajectory information of the stereo interactive operating stick, calculate invasion degree information of an invasion that the stereo interactive operating stick applies to the virtual object according to the motion trajectory information and preset property information of the virtual object, calculate interaction feedback information according to the motion trajectory information, the invasion degree information and the preset property information, and send a first control signal and a second control signal to the stereo interactive operating stick and the display unit respectively according to the interaction feedback information; the stereo interactive operating stick makes a response matched with the preset property of the virtual object after receiving the first control signal, and the display unit displays the virtual object being made a response matched with the preset property of the virtual object after receiving the second control signal.

In this embodiment, since the virtual object is not real, the property of the virtual object can be set by program to represent the characteristics of the virtual object. The preset property of the virtual object can be type, harness, material, shape, etc., of the virtual object. According to the motion trajectory information of the stereo interactive operating stick and the preset property information of the virtual object, an intersection degree of the stereo interactive operating stick and the virtual object can be determined, and then the invasion degree information of the stereo interactive operating stick applied to the virtual object can be determined. The invasion degree information can be information of an operation that the stereo interactive operating stick performs to the virtual object, such as squeezing degree information, invaded degree information or collision degree information. When the stereo interactive operating stick interacts with the display device, the interaction feedback information is obtained according to the motion trajectory information, the invasion degree information and the preset property of the virtual object, the interaction feedback information then is converted into a first control signal and a second control signal to control the stereo interactive operating stick and the virtual object to make responses matched with the preset property of the virtual object. The response state of the stereo interactive operating stick may be for example that the stereo interactive operating stick generates a damping force to make the user to feel a resisting force and/or generates pressure acting on the user's hand, so that the user can feel real feedback information like operating a real object.

In addition, the stereo interactive display device according to the above embodiment of the present invention may further have the additional features as follows.

In the above technical solution, preferably, the interactive unit includes a relative gesture calculating unit configured to receive the information of triggered button and the gesture information of the stereo interactive operating stick, calculate the motion trajectory information of the stereo interactive operating stick according to the information of triggered button and the gesture information, and send the motion trajectory information to an invasion degree calculating unit and an interaction logic unit. The invasion degree calculating unit is configured to calculate the invasion degree information according to the motion trajectory information and the preset property information of the virtual object, and send the invasion degree information to an interaction feedback unit and the interaction logic unit. The interaction logic unit is configured to determine the operation type information of an operation that the stereo interactive operating stick performs to the virtual object according to the invasion degree information, the motion trajectory information and the preset property information of the virtual object, send the operation type information to the interaction feedback unit, receive the interaction feedback information from the interaction feedback unit, and generate the first control signal and the second control signal according to the interaction feedback information. The interaction feedback unit is configured to calculate the interaction feedback information according to operation type information and the invasion degree information and send the interaction feedback information to the interaction logic unit. After the motion trajectory of the stereo interactive operating stick is obtained, by combining the invasion degree information and the preset property information of the virtual object, the operation type of the virtual object being operated can be determined, and then by combining the motion trajectory information and the preset property information of the virtual object, the invaded degree is determined, invasion degree information corresponding to the determined invaded degree can be obtained, such as invaded length, squeezed degree or moved distance. Based on the preset property information of the virtual object designed in current scene and currently-obtained invasion degree information and motion trajectory information, the current operation type can be determined and what state of the stereo interactive operating stick needed to be controlled can be calculated, i.e., the interaction feedback information is determined. Since the virtual object may be visually inside the screen or outside the screen, the conversion of calculated state feedback data is required according to different scenes, so as to meet the current scene and meanwhile allow the user to experience the real tactile impression.

In any one of the above technical solutions, preferably, when the preset property of the virtual object is an elastic object with certain hardness, the invasion degree information is squeezing degree information of the virtual object being squeezed, the operation type information is squeezing type information, the stereo interactive operating stick comprises a force feedback unit and a damping generation unit. When the squeezed virtual object is visually outside the screen, the interaction logic unit generates the first control signal according to the interaction feedback information, the first control signal is a force feedback intensity control signal. When the squeezed virtual object is visually inside the screen, the interaction logic unit generates the first control signal according to the interaction feedback information, and the first control signal includes a damping force control signal and a force feedback intensity control signal. In other words, when the squeezed virtual object is visually outside the screen, the first control signal is the force feedback intensity control signal which is converted from the force feedback intensity information and output to the force feedback unit of the stereo interactive operating stick by the interaction logic unit, to thereby control the stereo interactive operating stick to make a response matched with the operation type and the property of the virtual object; when the squeezed virtual object is visually inside the screen, the first control signal includes a damping force control signal which is converted from the damping force information and output to the damping generation unit of the stereo interactive operating stick and a force feedback intensity control signal which is converted from the force feedback intensity information and output to the force feedback unit by the interaction logic unit, to thereby control the stereo interactive operating stick to make a response matched with the operation type and the preset property of the virtual object. The force feedback unit is configured for generating a vibration with corresponding amplitude according to the force feedback intensity control signal, and the damping generation unit is configured for generating a damping force according to the damping force control signal.

In a typical scene, the stereo interactive operating stick tests the hardness of the virtual object. In this scene, the virtual object is designed to be an elastic object with certain hardness. When the stereo interactive operating stick performs an operation to the virtual object, the virtual object can be squeezed by the stereo interactive operating stick. At this time, the invasion degree information is squeezing degree information. According to the squeezing degree information and operation type information, the interaction feedback information is determined. The interaction feedback information includes damping force information and/or force feedback intensity information (it is assumed that the stereo interactive operating stick includes a damping generation unit and a force feedback unit, the damping generation unit is for producing determined damping force, the force feedback unit is for producing determined force feedback intensity).

When the virtual object being visually outside the screen is squeezed, since a telescopic portion of the stereo interactive operating stick cannot telescope, it cannot use the damping generation unit to generate the damping force, and only can use the force feedback unit to produce the force feedback intensity. When the virtual object being visually inside the screen is squeezed, it is needed to generate damping force and force feedback intensity. In brief, the conversion of interaction feedback information is required according to different scenes. Accordingly, in this embodiment, the interaction feedback information is determined by the squeezing degree information and squeezing type information, and then the interaction feedback information is converted into the first control signal capable of controlling the damping generation unit and/or force feedback unit of the stereo interactive operating stick to perform corresponding operations, so that the user can experience corresponding tactile impression, for example, when the damping generation unit generates a resisting force, the user can feel an elastic force during squeezing the virtual object, and when the force feedback unit generates a pressure, the user also can feel the elastic force during squeezing the virtual object.

In any one of the above technical solutions, preferably, when the preset property of the virtual object is an elastic object with possible elastic collision, the invasion degree information is collision momentum information of the virtual object, the operation type information is collision type information, and the stereo interactive operating stick includes a force feedback unit and a damping generation unit. The interaction feedback unit calculates the collision momentum information at a collision position of the stereo interactive operating stick and the virtual object. When a collision being visually outside the screen occurs, the interaction feedback information which is calculated according to the collision momentum information and preset mass and hardness of the virtual object includes force feedback intensity information and force feedback duration information; or, when a collision being visually inside the screen occurs, the interaction feedback information which is calculated according to the collision momentum information and preset mass and hardness of the virtual object includes damping magnitude information, damping duration information and force feedback intensity information. When the collision being visually outside the screen occurs, the first control signal is a force feedback intensity control signal which is output to the force feedback unit of the stereo interactive operating stick by the interaction logic unit according to the force feedback intensity information and the force feedback duration information; or when the collision being visually inside the screen occurs, the first control signal includes a damping force control signal which is output to the damping generation unit of the stereo interactive operating stick and a force feedback intensity control signal which is output to the force feedback unit by the interaction logic unit according to the damping magnitude information, the damping duration information and the force feedback intensity information. The force feedback unit is configured for generating a vibration with corresponding amplitude according to the force feedback intensity control signal, and the damping generation unit is configured for generating a damping force according to the damping force control signal.

In any one of the above technical solutions, preferably, when the preset property of the virtual object is an object with multi-level hardness, the invasion degree information is an invaded destructive length of the virtual object, the operation type information is invasion destructive type information, and the stereo interactive operating stick includes a force feedback unit and a damping generation unit. The interaction feedback unit calculates total damping force information corresponding to a current invaded length according to corresponding relationships between preset hardness of each level and damping force, and the total damping force information is the interaction feedback information. When the invaded virtual object is an object being visually outside the screen, the first control signal is a force feedback intensity control signal which is output to the force feedback unit of the stereo interactive operating stick by the interaction logic unit after converting the total damping force information into force feedback intensity information and force feedback duration information. When the invaded virtual object is an object being visually inside the screen, the first control signal includes a damping force control signal which is output to the damping generation unit of the stereo interactive operating stick and a force feedback intensity control signal which is output to the force feedback unit by the interaction logic unit according to the total damping force information. The force feedback unit is configured for generating a vibration with corresponding amplitude according to the force feedback intensity control signal, and the damping generation unit is configured for generating a damping force according to the damping force control signal.

In any one of the above technical solutions, preferably, the display unit controls the virtual object to make a response matched with the operation type and the preset property of the virtual object according to the second control signal. When the stereo interactive operating stick interacts with the stereo display device, the virtual object also can make a response matched with current operation type and the preset property of the virtual object, so as to allow the user to visually feel the change of the virtual object.

An embodiment according to a third aspect of the present invention provides a stereo interactive operating stick. The stereo interactive operating stick includes a state feedback unit. The state feedback unit is configured for receiving the first control signal from the stereo interactive display device in any one of the above technical solutions. The stereo interactive operating stick makes a response matched with the preset property of the virtual object according to received first control signal.

The state of the stereo interactive operating stick changes with specific operation process and property of the virtual object, so that the user holding the stereo interactive operating stick at hand can feel corresponding operation state and get a real tactile impression, and thus the operation experience is improved.

In the above technical solution, preferably, the state feedback unit includes: a damping generation unit configured for producing a damping force according to the first control signal; and a force feedback unit, configured for producing a vibration with corresponding amplitude according to the first control signal.

An embodiment according to a fourth aspect of the present invention provides a stereo interactive system. The stereo interactive system includes: the stereo interactive operating stick in any one of the above technical solutions; and the stereo interactive display device in any one of the above technical solutions.

Part of additional aspects and advantages of the present invention will be given in the following description, and part thereof will become obvious from the following description or be learned through practicing the present invention.

BRIEF DESCRIPTION OF THE DRAWINGS

The above and/or additional aspects and advantages of the present invention will become obvious and easily understood from the following description of the embodiments in conjunction with the accompany drawings, in which.

DETAILED DESCRIPTION OF EMBODIMENTS

In order to more clearly understand the above objectives, features and advantages of the present invention, embodiments of the present invention will be described below in detail with reference to accompanying drawings. It is noted that, in the case of no conflict, the embodiments of the present invention and features in the embodiments can be combined with each other.

In the following description, numerous specific details are set forth in order to fully understand the present invention, however, the present invention also can be embodied by other ways different from that described herein, and therefore the scope of the present invention is not limited to the description disclosed in below embodiments.

[First Embodiment]

Figure 1:
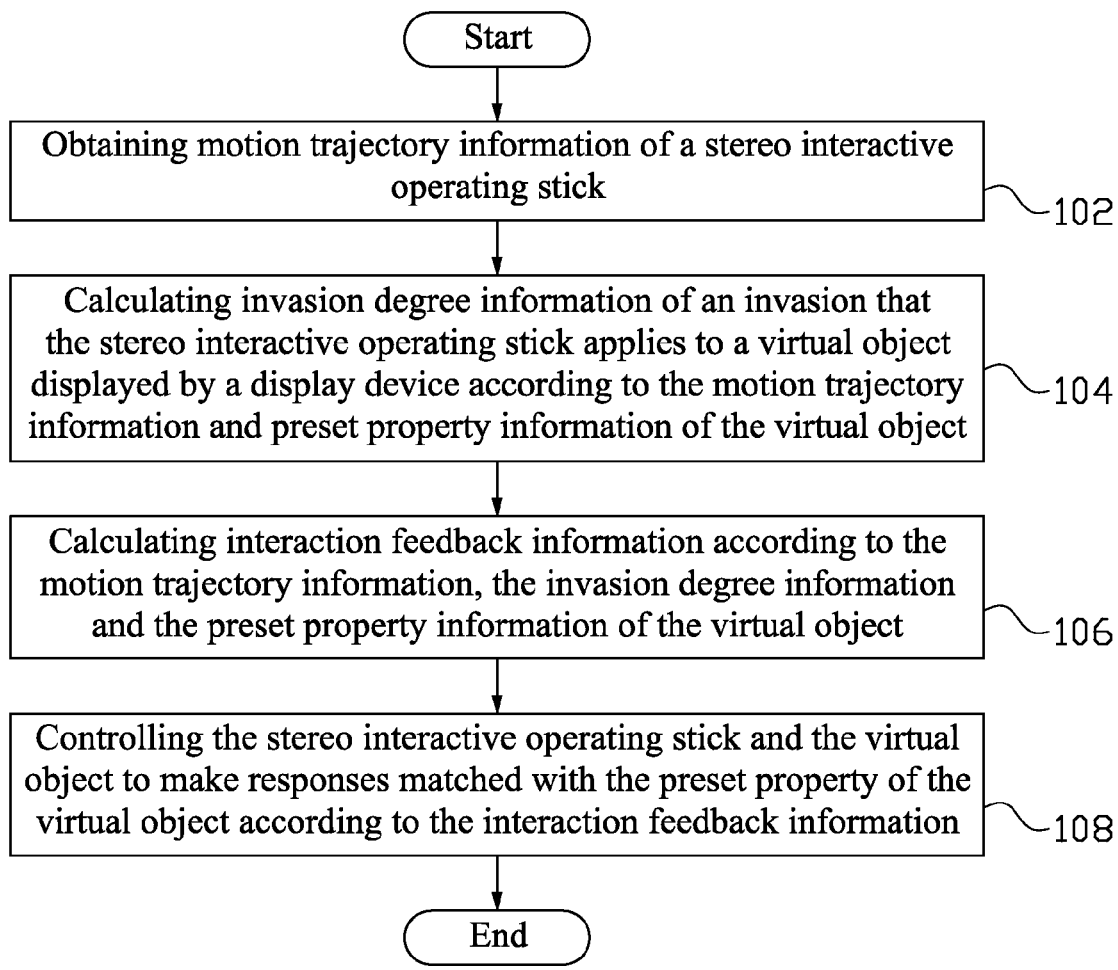
FIG. 1 is a schematic flowchart of a stereo interactive method according to an embodiment of the present invention.

FIG. 1 is a schematic flowchart of a stereo interactive method according to an embodiment of the present invention.

As illustrated in FIG. 1, the stereo interactive method according to the embodiment of the present invention includes the following steps of: step 102, obtaining motion trajectory information of a stereo interactive operating stick; step 104, calculating invasion degree information of an invasion that the stereo interactive operating stick applies to a virtual object displayed by a display device according to the motion trajectory information and preset property information of the virtual object; step 106, calculating interaction feedback information according to the motion trajectory information, the invasion degree information and the preset property information; and step 108, controlling the stereo interactive operating stick and the virtual object to make responses matched with the preset property of the virtual object according to the interaction feedback information.

In this embodiment, since the virtual object is not real, the property of the virtual object can be set by a program to represent the characteristics of the virtual object. The preset property of the virtual object can be type, hardness, material, shape and so on. According to the motion trajectory information of the stereo interactive operating stick, an intersection degree of the stereo interactive operating stick with the virtual object can be determined, and then the invasion degree information of the stereo interactive operating stick applied to the virtual object can be determined. The invasion degree information can be information of the operation that the stereo interactive operating stick performs to the virtual object, such as squeezing degree information, invaded degree information, collision degree information. When the stereo interactive operating stick interacts with the display device, according to the motion trajectory information, the invasion degree information and the preset property of the virtual object, the interaction feedback information is determined and then used to generate corresponding control signals to thereby control the state of the stereo interactive operating stick and the state of the virtual object, i.e., control the stereo interactive operating stick and the virtual object to make corresponding responses.

The response of the stereo interactive operating stick integrates the motion property of the operating stick itself and the property of the virtual object, so that a feeling finally fed back to the operator is the response consistent with the operating stick and the preset property of the virtual object, which significantly improves the immersion and reality to the operator. Response behaviors of the stereo interactive operating stick may be for example that the stereo interactive operating stick generates a damping force and pressure, so that the user can feel a resisting force and/or pressure applied to the user's hand. The feeling of damping force and/or pressure is similar to the feeling of operating a real object to change to be certain state, so that the user can feel the real feedback information like operating a real object.

In addition, the stereo interactive method according to the above embodiment of the present invention may further have additional technical features as follows.

In the above technical solution, preferably, the step of obtaining motion trajectory information of a stereo interactive operating stick includes: obtaining the motion trajectory information of the stereo interactive operating stick according to information of a triggered button on the stereo interactive operating stick and gesture information of the stereo interactive operating stick. The step of calculating an interaction feedback information according to the motion trajectory information, the invasion degree information and the preset property information of the virtual object includes: determining operation type information of an operation that the stereo interactive operating stick performs to the virtual object according to the invasion degree information, the motion trajectory information and the preset property information of the virtual object, and calculating the interaction feedback information according to the operation type information and the invasion degree information; and then controlling the stereo interactive operating stick and the virtual object to make the responses matched with the operation type and the preset property of the virtual object according to the interaction feedback information.

The operation type information is information of the operation that the operating stick performs to the virtual object obtained by comprehensively judging the motion trajectory information, the invasion degree information and the preset property information of the virtual object, for example, squeezing operation information, collision type operation information or invasive type operation information obtained by comprehensive judgment.

After the motion trajectory of the stereo interactive operating stick is obtained, the invasion degree information can be determined according to the motion trajectory information and the preset property information of the virtual object, and then the operation type information such as invaded length, squeezed degree or moved distance of the operation that the stereo interactive operating stick performs to the virtual object can be determined according to the invasion degree information, the motion trajectory information and the preset property information of the virtual object. In other words, based on the designed virtual object in current scene and currently-obtained invasion degree information, current operation type information can be determined, and then the interaction feedback information is determined according to the operation type information and the invasion degree information. Afterwards, the interaction feedback information is converted into a control signal for controlling the stereo interactive operating stick to make a response matched with the currently-determined operation type and the preset property of the virtual object. For example, when the preset property of the virtual object is an elastic object, and the currently-determined operation type is squeezing an elastic object, during the operator operates the stereo interactive operating stick, the operator can feel a repulsive force like squeezing a real object.

Furthermore, the operating stick is equipped with a force feedback unit and a damping generation unit, the effect of the repulsive force can be reflected/embodied by a damping force generated by the damping generation unit and a force feedback generated by the force feedback unit. Therefore, the stereo interactive method according to the present invention is not a simple interactive operation, and can make the stereo interactive operating stick and the virtual object to do matched responses according to the operation type of the operation that the stereo interactive operating stick currently performs to the virtual object and the preset property of the operated virtual object, which allows the user to have an intuitive tactile impression, and thus simulates the real operation environment and improves the user experience. Furthermore, since the virtual object may be a virtual object being visually inside the screen or a virtual object being visually outside the screen, conversion of the interaction feedback information is required to generate corresponding control signals according to different scenes, so as to meet the current scene and meanwhile allow the user to feel the real tactile impression.

Preferably, the operating stick has a preset property. The preset property of the operating stick may be for example mass of the operating stick. The virtual object makes a response matched with the preset property of the operating stick and the preset property of the virtual object according to the interaction feedback information and the preset property of the operating stick.

In any one of the above technical solutions, preferably, when the preset property of the virtual object is an elastic object with certain hardness, the invasion degree information is squeezing degree information of the virtual object being squeezed, the operation type information is squeezing type information, and the interaction feedback information calculated according to the squeezing degree information and the squeezing type information is damping force information and/or force feedback intensity information. When the squeezed virtual object is a virtual object being visually outside the screen, the force feedback intensity information is converted into a force feedback intensity control signal which is output to the force feedback unit on the stereo interactive operating stick, so as to control the stereo interactive operating stick to make a response matched with the operation type and the preset property of the virtual object. Or, when the squeezed object is a virtual object being visually inside the screen, the damping force information and the force feedback intensity information respectively are converted into a damping force control signal which is output to the damping generation unit and a force feedback intensity control signal which is output to the force feedback unit of the stereo interactive operating stick, so as to control the stereo interactive operating stick to make a response matched with the operation type and the preset property of the virtual object.

In a typical scene, the stereo interactive operating stick tests the hardness of the virtual object. In this scene, the virtual object is designed to be an elastic object with certain hardness. When the stereo interactive operating stick performs an operation to the virtual object, the virtual object can be squeezed by the stereo interactive operating stick. The invasion degree information is squeezing degree information. Corresponding interaction feedback information such as damping force information and/or force feedback intensity information is determined by the squeezing degree information, the motion trajectory information and the preset property information of the virtual object. For example, the stereo interactive operating stick includes a damping generation unit and a force feedback unit. The damping generation unit is configured (i.e., structured and arranged) for generating determined damping force, and the force feedback unit is configured for generating a vibration with corresponding amplitude. The damping force information and/or force feedback intensity information are converted into corresponding damping force control signal and/or force feedback intensity control signal, so as to control the damping generation unit to generate corresponding damping force and the force feedback unit to generate corresponding force feedback intensity.

When a virtual object being visually outside the screen is squeezed, since the telescopic section of the stereo interactive operating stick cannot telescope, it cannot use the damping generation unit to generate damping force, and only can use the force feedback unit to generate force feedback intensity. When a virtual object being visually inside the screen is squeezed, it is needed to generate damping force and force feedback intensity. Therefore, conversion of the interaction feedback information is required according to different scenes. In this embodiment, the interaction feedback information is determined by the squeezing degree information and the squeezing type information, and the interaction feedback information can control the damping generation unit and/or force feedback unit of the stereo interactive operating unit to perform corresponding actions after being converted into a corresponding control signal, so as to allow the operator to get a corresponding tactile impression. For example, when the damping generation unit generates a damping force, the operator can feel an elastic force during squeezing the virtual object; when the force feedback unit generates pressure, the operator also can feel an elastic force during squeezing the virtual object.

In any one of the above technical solutions, preferably, when the preset property of the virtual object is an elastic object with possible elastic collision, the invasion degree information is collision momentum information of the virtual object, and the operation type information is collision type information. When a collision being visually outside the screen occurs, the interaction feedback information includes force feedback intensity information and force feedback duration information calculated according to the collision momentum information and preset mass and hardness of the virtual object, and the interaction feedback information then is converted into a force feedback intensity control signal which is output to the force feedback unit of the stereo interactive operating stick, so as to control the stereo interactive operating stick to make a response matched with the operation type and the property of the virtual object. When a collision being visually inside the screen occurs, the interaction feedback information includes damping magnitude information, damping duration information and force feedback intensity information calculated according to the collision momentum information and preset mass and hardness of the virtual object, and the interaction feedback information then is converted into a damping force control signal which is output to the damping generation unit and a force feedback intensity control signal which is output to the force feedback unit of the stereo interactive operating stick, so as to control the stereo interactive operating stick to make a response matched with the operation type and the property of the virtual object.

Another typical scene is that the stereo interactive operating stick collides with the virtual object, the invasion degree information is collision momentum information, and the operation type information is collision type information. The interaction feedback information for the stereo interactive operating stick is determined according to the collision momentum information and the collision type information, the interaction feedback information is force feedback intensity information, force feedback duration information, and/or damping magnitude information and damping duration information. The interaction feedback information then is converted into corresponding control signals to control the operating stick and the virtual object to make responses matched with the preset property of the virtual object, so that the operator can experience real collision occurred between the stereo interactive operating stick and the virtual object.

In any one of the above technical solutions, preferably, when the preset property of the virtual object is an object with multi-level harness, the invasion degree information is an invaded destructive length of the virtual object, and the operation type information is invasion destructive type information. The interaction feedback information includes total damping force information corresponding to the current invaded length calculated according to corresponding relationships between preset hardness of respective levels and damping forces, and the total damping force information includes force feedback intensity information and force feedback duration information. When the invaded virtual object is an object being visually outside the screen, the total damping force information is converted into a force feedback intensity control signal which is output to the force feedback unit of the stereo interactive operating stick, so as to control the stereo interactive operating stick to make a response matched with the operation type and the property of the virtual object. When the invaded virtual object is an object being visually inside the screen, the total damping force information includes force feedback intensity information, force feedback duration information, damping force information and damping force duration information. The total damping force information then is converted into a damping force control signal which is output to the damping generation unit and a force feedback intensity control signal which is output to the force feedback unit of the stereo interactive operating stick, so as to control the stereo interactive operating stick to make a response matched with the operation type and the property of the virtual object. Furthermore, the virtual object also makes a response matched with the operation type and the preset property of the virtual objection.

In still another typical scene, the stereo interactive operating stick invades into the virtual object, for example cuts the virtual object. The operation type information is cutting type information, and the invasion degree information is information of invaded length inside the virtual object. The interaction feedback information includes damping force information and force feedback intensity information ought to be exhibited by the stereo interactive operating stick and calculated according to the invaded length information of the virtual object, the motion trajectory information and preset property information of hardness exhibited by the virtual object at different lengths. The interaction feedback information then is converted into a corresponding control signal, to allow the operator to feel a real feeling like the stereo interactive operating stick cutting an object.

[Second Embodiment]

Figure 2:
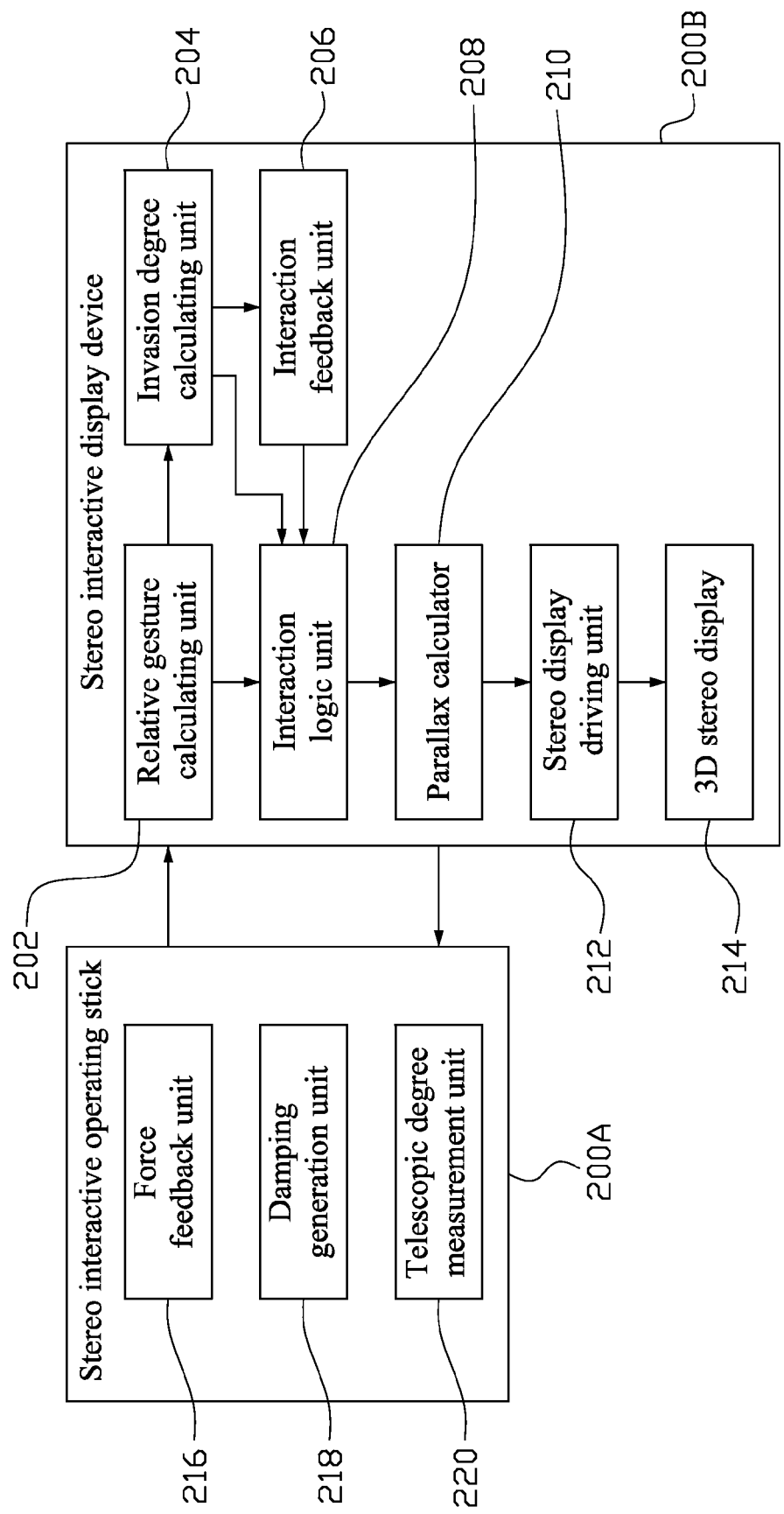
FIG. 2 is a schematic view of a stereo interactive display device according to an embodiment of the present invention.

FIG. 2 is a schematic view of a stereo interactive display device according to an embodiment of the present invention.

As shown in FIG. 2, the stereo interactive operating stick 200A and the stereo interactive display device 200B can data communicate with each other, and the stereo interactive operating stick 200A can generate information of triggered button and gesture information. The information of triggered button can be information such as grip, confirm and cancel.

The stereo interactive display device 200B includes a display unit for displaying a virtual image, and an interactive unit for interacting with a stereo interactive operating stick and the display unit. The display unit includes a stereo display driving unit 212 and a 3D stereo display 214.

In particular, the interactive unit is configured for obtaining motion trajectory information of the stereo interactive operating stick, calculating invasion degree information of an invasion that the stereo interactive operating stick applies to the virtual object according to the motion trajectory information and preset property information of the virtual object, calculating interaction feedback information according to the motion trajectory information, the invasion degree information and the preset property information, and sending a first control signal to the stereo interactive operating stick and a second control signal to the display unit. The stereo interactive operating stick make a response matched with the preset property of the virtual object after receiving the first control signal, and after the display unit receives the second control signal, the displayed virtual object makes a response matched with the preset property of the virtual object.

Moreover, the interactive unit includes a relative gesture calculating unit 202, an invasion degree calculating unit 204, an interaction logic unit 208, an interaction feedback unit 206, and a parallax calculator 210. Apparently, the interactive unit can use other expression to embody its content, and various variations made based on this ought to be within the scope of the present invention.

The relative gesture calculating unit 202 receives information of triggered button and gesture information from the stereo interactive operating stick, calculates the motion trajectory information of the stereo interactive operating stick according to the information of triggered button and gesture information, and sends the motion trajectory information to the invasion degree calculating unit 204 and the interaction logic unit 208.

The invasion calculating unit 204 calculates the invasion degree information according to the motion trajectory information and the preset property of the virtual object, and sends the invasion degree information to the interaction feedback unit 206 and the interaction logic unit 208.

The interaction logic unit 208 determines operation type information of an operation the stereo interactive operating stick performs to the virtual object according to the invasion degree information, the motion trajectory information and the preset property information of the virtual object, sends the operation type information to the interaction feedback unit 206, receives the interaction feedback information from the interaction feedback unit 206, and generates the first control signal and the second control signal according to the interaction feedback information.

The interaction feedback unit 206 calculates the interaction feedback information according to the operation type information and the invasion degree information, and sends the interaction feedback information to the interaction logic unit 208.

The operation type information is operation information of the operation that the stereo interactive operating stick performs to the virtual object obtained by comprehensively judging the motion trajectory information, the invasion degree information and the preset property information of the virtual object. The operation information for example is squeezing operation information, collision type operation information or invasion operation information obtained by the comprehensively judging.

The first control signal includes a force feedback intensity control signal and/or a damping force control signal. The second control signal is a display command which is issued to the display unit.

The stereo interactive operating stick 200A includes a force feedback unit 216, a damping generation unit 218 and a telescopic degree measurement unit 220. The stereo interactive operating stick 200A sends generated information of triggered button and gesture information to the stereo interactive display device 200B. The force feedback unit 216 is configured for responding the force feedback intensity control signal sent from the stereo interactive display device 200B. The damping generation unit 218 is configured for responding the damping force control signal sent from the stereo interactive display device 200B. The user holding the stereo interactive operating stick at hand can feel pressure generated by the force feedback unit 216 and the damping force generated by the damping generation unit 218.

When the stereo interactive operating stick interacts with a virtual object, the stereo interactive display device determines the interaction feedback information according to preset property of the virtual object, invasion degree information and operation type information of an operation that the stereo interactive operating stick currently performs to the virtual object. The interaction feedback information then is converted into corresponding first control signal and second control signal by the interaction logic unit 208. The first control signal is to control the damping generation unit and the force feedback unit of the stereo interactive operating stick to perform corresponding actions, so that the operator holding the stereo interactive operating stick at hand can feel a real operation tactile impression. The second control signal is to control the virtual object to be displayed with a corresponding state change.

The relative gesture calculating unit 202 primarily has the following two methods to calculate the motion trajectory information of the stereo interactive operating stick according to the information of a triggered button on the stereo interactive operating stick and the gesture information of the stereo interactive operating stick.

Figure 3A:
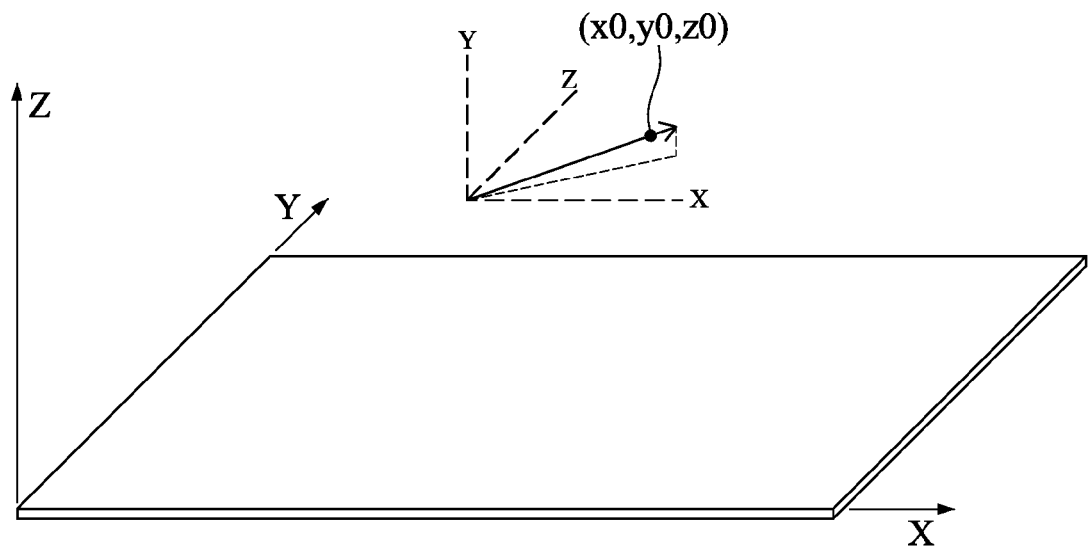
FIG. 3A is a schematic view of gesture and spatial position of a stereo interactive operating stick with respect to a stereo display screen according to an embodiment of the present invention.

One method is shown in FIG. 3A, which uses a means for the positioning of the stereo interactive operating stick such as an ultrasonic positioning system or a depth camera positioning system to obtain a spatial coordinates (x0, y0, z0) of a preset point of the stereo interactive operating stick, uses a strap-down inertial navigation system constituted by a three-axis gyroscope, an accelerometer and a magnetometer installed on the stereo interactive operating stick to obtain a gesture of the stereo interactive operating stick relative to ground level, and uses a strap-down inertial navigation system constituted by a three-axis gyroscope, an accelerometer and a magnetometer installed on the stereo interactive display device to obtain a gesture of the 3D display screen relative to ground level. The gestures each can be expressed by roll angle, pitch angle and yaw angle, and also can be expressed by orientation cosine matrix and quaternion, the specific data output is relevant to algorithm of the used strap-down inertial navigation system. However, regardless of which one expression, it can be very conveniently used for subsequent gesture integration. The data can be directly used for related graphics calculation after the data are converted and placed in a coordinate system with respect to ground. That is, real time accurate position and gesture of the stereo interactive operating stick are obtained.

Figure 3B:
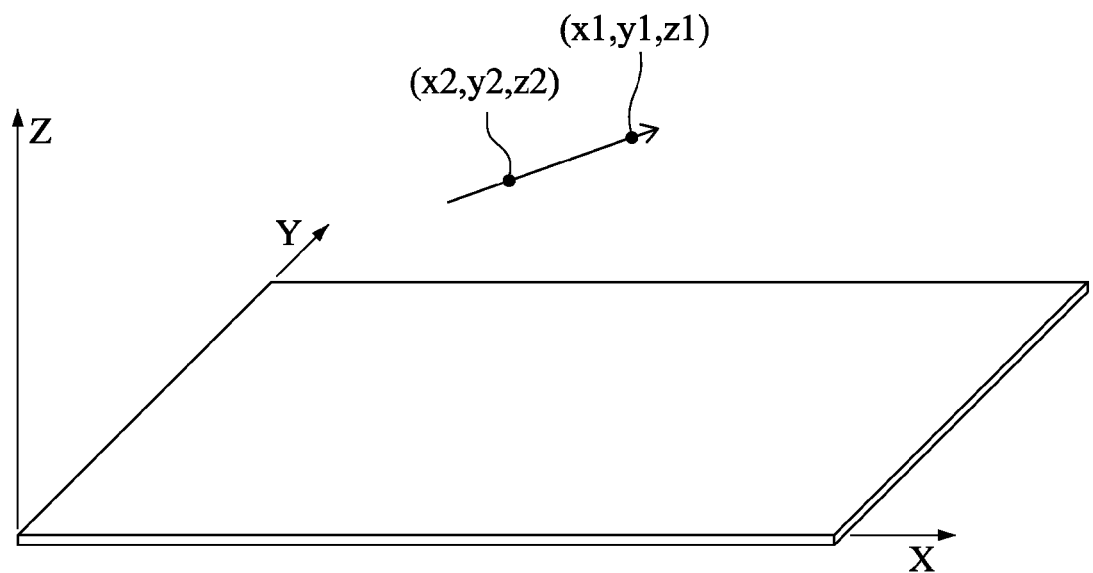
FIG. 3B is a schematic view of gesture and spatial position of a stereo interactive operating stick with respect to a stereo display screen according to an embodiment of the present invention.

The other method is shown in FIG. 3B, which uses a means for the positioning of the stereo interactive operating stick such as an ultrasonic positioning system or a depth camera positioning system to obtain spatial coordinates (x1, y1, z1) and (x2, y2, z2) of two preset points with a distance of L on the stereo interactive operating stick. Since the receiving or transmitting part for obtaining the coordinates is designed according to a special geometric position and installed on the 3D display screen, the obtained coordinates have been coordinates with respect to the plane of 3D display screen. By introducing the actual distance L of the two points on the stereo interactive operating stick into a corresponding coordinate system, what is obtained essentially is a spatial vector of the stereo interactive operating stick, and thus can be directly used for related graphics calculation. That is, the accurate position and gesture of the stereo interactive operating stick are obtained consequently.

After obtaining the motion trajectory information of the stereo interactive operating stick, a working process of the stereo interactive display device according to the present invention will be described below in detail with reference to three typical scenes.

A first typical scene is that the stereo interactive operating stick interacts with an elastic virtual object with certain hardness.

Figure 4A:
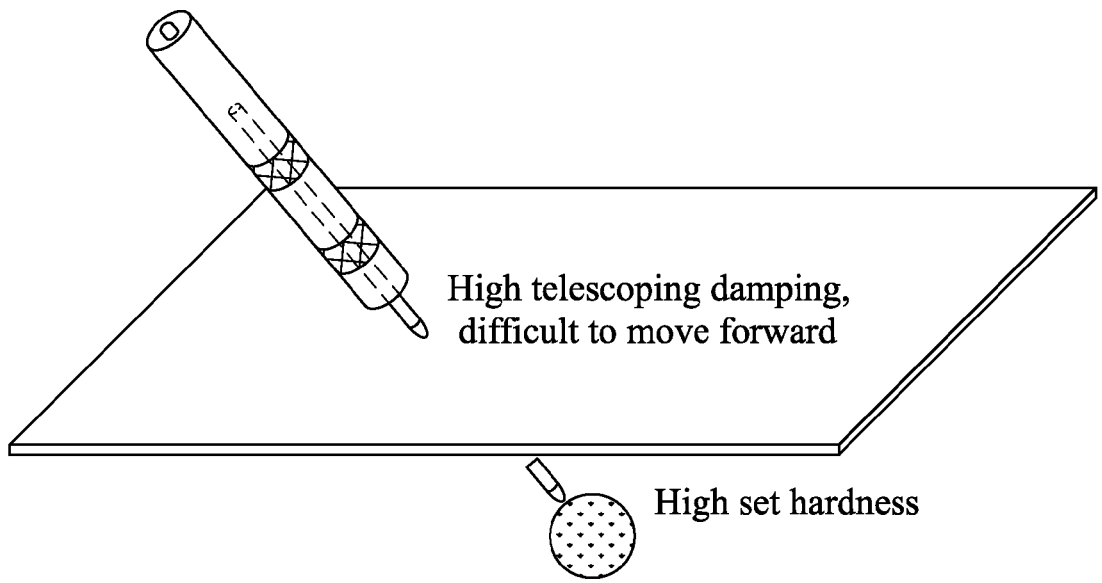
FIGS. 4A and 4B are schematic views of a stereo interactive operating stick interacting with elastic virtual objects being visually inside the screen and have different hardness according to an embodiment of the present invention.
Figure 4B:
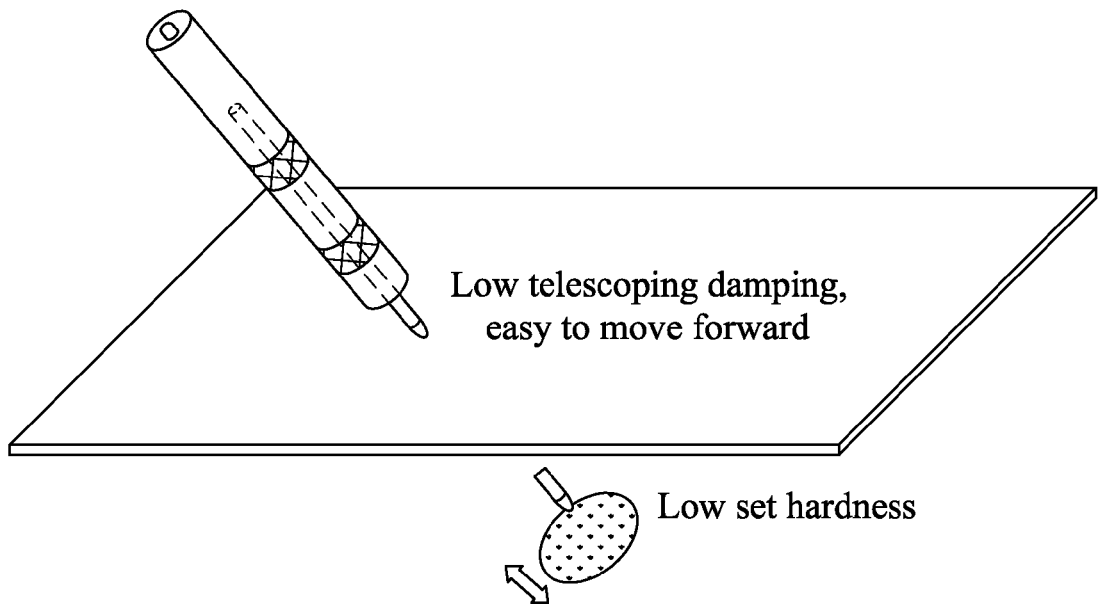

FIGS. 4A and 4B are schematic views of a stereo interactive operating stick interacting with elastic virtual objects being visually inside the screen and have different hardness.

In this scene, the preset property of the virtual object is an elastic object with certain hardness, the invasion degree information is squeezing degree information of the virtual object being squeezed, and the operation type information is squeezing type information. The operator uses the stereo interactive operating stick to perform a motion being visually inside the screen, the telescopic device of the stereo interactive operating stick would retract, and an extending portion of the stereo interactive operating stick is displayed in the screen. When the portion of the stereo interactive operating stick extending into the screen is contacted with the virtual object, the invasion degree calculating unit 204 calculates current squeezing degree information of the stereo interactive operating stick to the virtual object according to the motion trajectory information from the relative gesture calculating unit 202 and sends the squeezing degree information to the interaction feedback unit 206.

It is indicated that, since the spatial position of the virtual object and the spatial position and gesture of the stereo interactive operating stick have been determined, it is easily to obtain the squeezing degree information of the stereo interactive operating stick to the virtual object in the spatial position, and the squeezing degree information can generate different effects according to the interactive situations:

If the virtual object is set to be a linear elastic object, a squeezing depth without deformation is Pmin, and a maximum squeezing depth of the virtual object is Pmax, a current squeezing depth calculated according to the spatial coordinate(s) and gesture of the stereo interactive operating stick sent from the relative gesture calculating unit 202 is Px, and then the squeezing degree information of current virtual object is P=(Px/Pmax)×100%, a value of which is a percentage parameter. As shown in FIG. 4E, the value is sent to the interaction feedback unit 206.

If the virtual object is set to be a nonlinear elastic object, the squeezing degree information P can be set as a function relevant to Px, the specific function can be set according to actual application, and will not be described in detail herein.

The interaction feedback unit 206 receives the squeezing type information (the operation type information is squeezing type information in this embodiment) from the interaction logic unit 208 and receives the squeezing degree information P from the invasion degree calculating unit 204, multiplies the squeezing degree information P with a maximum damping of the damping generation unit 218 and a maximum amplitude of the force feedback unit 216 according to the squeezing type information to obtain the interaction feedback information i.e., currently-required damping force information and force feedback intensity information, and then sends the damping force information and the force feedback intensity information to the interaction logic unit 208.

The interaction logic unit 208 determines operation type information (squeezing type information in this embodiment) of an operation that the stereo interactive operating stick performs to the virtual object according to the squeezing degree information, the motion trajectory information and the preset property information of the virtual object, and then sends the operation type information to the interaction feedback unit 206. The interaction logic unit 208 converts the damping force information and the force feedback intensity information in the interaction feedback information to generate a first control signal, and meanwhile the interaction logic unit 208 generates a second control signal according to the motion trajectory information, the invasion degree information and the preset property information of the virtual object. The first control signal (damping force control signal and force feedback intensity control signal) is sent to the stereo interactive operating stick to control the stereo interactive operating stick to make a corresponding response. The second control signal is sent to the display unit to control the displayed virtual object to make a corresponding change. Furthermore, the operating stick has a preset property, and the interaction logic unit 208 generates the second control signal according to the motion trajectory information, the invasion degree information, the preset property information of the virtual object and the preset property information of the operating stick to make the response of the virtual object to much more meet the operation of the operator. In other words, the operating stick has a preset property, and the interaction logic unit 208 generates the second control signal according to the interaction feedback information, the preset property information of the virtual object and the preset property information of the operating stick, to make the response of the virtual object to much more meet the operation of the operator.

The above corresponding response is that: the squeezed virtual object would be deformed, with the increase of degree of deformation, damping generated by the damping generation unit 218 of the telescopic section of the stereo interactive operating stick and force feedback intensity generated by the force feedback unit would correspondingly increase. When the virtual object which is squeezed cannot be squeezed any more, the telescopic device of the stereo interactive operating stick would be clinched by the damping generation unit 218 and thus cannot further retract.

Accordingly, when the portion of the stereo interactive operating stick extending into the screen is contacted with the virtual object, the damping generation unit 218 of the stereo interactive operating stick generates a damping force, when the user continues to squeeze the virtual object, the damping force continues to increase and thereby generating a perceptual experience of hardness of object, so that the user can experience the tactile feelings of squeezing objects with different hardness. Meanwhile, the force feedback unit 21 of the stereo interactive operating stick would work simultaneously and generates a corresponding pressure feedback to skin, so as to improve the reality of the operation. The hardness of the virtual object shown in FIG. 4A is higher than the hardness of the virtual object shown in FIG. 4B, so that the damping force of the stereo interactive operating stick in FIG. 4A is larger than the damping force of the stereo interactive operating stick in FIG. 4B.

Figure 4C:
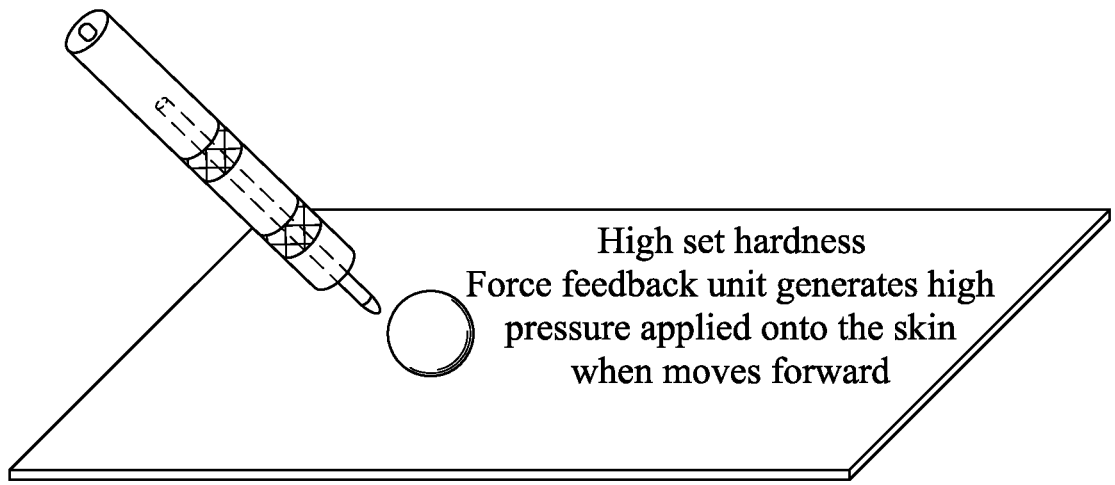
FIGS. 4C and 4D are schematic views of a stereo interactive operating stick interacting with elastic virtual objects being visually outside the screen and have different hardness according to an embodiment of the present invention.
Figure 4D:
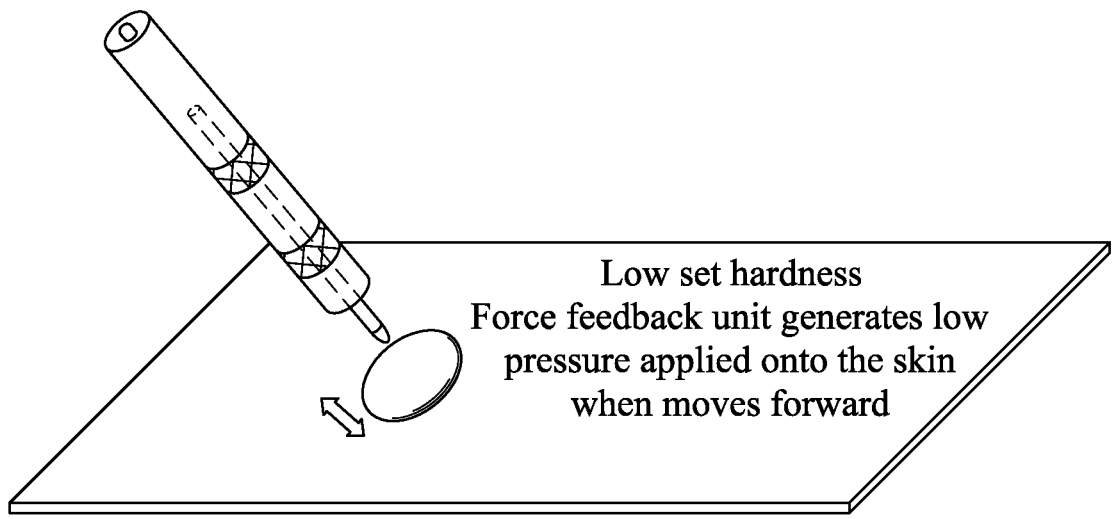
Figure 4E:
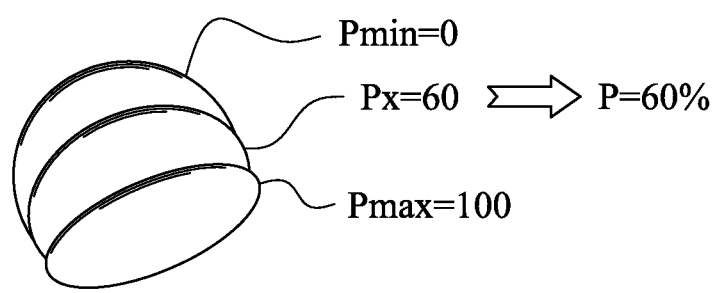
FIG. 4E is a schematic view of pressure generated when a stereo interactive operating stick squeezes an elastic virtual object according to an embodiment of the present invention.

FIGS. 4C and 4D are schematic views of a stereo interactive operating stick interacting with elastic virtual objects being visually outside the screen and have different hardness according to another application scene of the present invention.

When interaction is performed in the parallax being visually outside the screen, a processing process of the stereo interactive display device according to the present invention is similar to that occurred in the parallax being visually inside the screen, a difference is that: if a virtual object being visually outside the screen is squeezed, the telescopic section of the stereo interactive operating stick does not telescope. Thus, a damping feeling cannot be offered to the user by the damping generation unit 218. Therefore, the interaction feedback information calculated by the interaction feedback unit 206 only has force feedback intensity information. The first control signal generated by the interaction logic unit 208 according to the force feedback intensity information is a force feedback intensity control signal, and the force feedback intensity control signal then is sent to the force feedback unit 216 of the stereo interactive operating stick. The point of reflecting the force feedback intensity on the force feedback unit 216 is the pressure generated to the skin, and the damping force is positively proportional to the pressure. Due to the limit of the operation principle of the existing force feedback unit 216, regardless of eccentric motor or artificial muscles, it cannot provide a continuously increased sense of pressure to the skin, and the force feedback unit 216 gives a tactile impression which gives the contact surface of human skin a sense of by a continuous high-frequency vibration. The amplitude of the high-frequency vibration is positive proportional to the sense of pressure.

Accordingly, the interaction logic unit 208 converts the force feedback intensity information into a period of continuous first control signal for the force feedback unit 216, and sends the control signal to the stereo interaction operating stick to control the stereo interactive operating stick to make a response matched with the preset property of the virtual object.

The operator uses the stereo interactive operating stick to perform a motion being visually outside the screen, when the stereo interactive operating stick is contacted with the virtual object, if the user continues to squeeze the virtual object, the user will obtain a perceptual experience of hardness of object resulting from the sense of pressure applied onto the skin by the force feedback unit 216, and thus can experience the tactile feelings of squeezing objects with different hardness. As shown in FIGS. 4C and 4D, the hardness of the virtual object in FIG. 4C is higher than the hardness of the virtual object in FIG. 4D, and correspondingly the pressure generated by the force feedback unit 216 of the stereo interactive operating stick in FIG. 4C is greater than the pressure generated by the force feedback unit 216 of the stereo interactive operating stick in FIG. 4D. Moreover, the squeezed virtual object would be deformed, and with the increase of the degree of deformation, the pressure applied onto the skin by the force feedback unit 216 would increase correspondingly.

A second typical scene is that a stereo interactive operating stick elastically collides with a virtual object.

In this scene, the preset property of the virtual object is an elastic object with possible elastic collision.

In the scene, when a collision being visually inside the screen occurs, invasion degree information is collision momentum information calculated by the invasion degree calculating unit 204 according to the preset property and collision trajectory of the virtual object, and the collision momentum information then is sent to the interaction feedback unit 206 and the interaction logic unit 208. The invasion degree calculating unit 204 determines the invasion degree information according to coincidence between real time detected contour of the stereo interactive operating stick and contour of the virtual object. The contour of the virtual object is set in advance, and the contour of the stereo interactive operating stick is obtained by calculation according to feedback coordinate(s) of preset point(s) of the stereo interactive operating stick and the dimension known in advance of the stereo interactive operating stick.

In this embodiment, the interaction feedback information calculated by the interaction feedback unit 206 according to mass, hardness and momentum of the virtual object includes damping magnitude information, damping duration information and force feedback intensity information. Concrete relationships among the damping magnitude information, damping duration information, force feedback intensity information and the mass, harness of the virtual object can be obtained by the measurement of actual scene. The damping magnitude information, damping duration information and force feedback intensity information then are sent to the interaction logic unit 208. The interaction logic unit 208 sends a first control signal to the stereo interactive operating stick according to the damping magnitude information and the force feedback duration information, and meanwhile the interaction logic unit 208 sends a second control signal to the display unit. In a preferred embodiment, the operating stick has a preset property, and the interaction logic unit 208 generates the second control signal according to the preset property of the virtual object, the motion trajectory information and the preset property information of the operating stick.

That is, the invasion degree calculating unit 204 calculates collision momentum information of the stereo interactive operating stick at a collision position to the virtual object so as to facilitate the interaction logic unit 208 to simulate the collision physical process and save the motion trajectory information of the stereo interactive operating stick for a period of time in the past. After the collision position is determined, the invasion degree calculating unit 204 performs a comprehensive calculation to the motion trajectory of the stereo interactive operating stick, preset three-dimensional model of the stereo interactive operating stick and preset mass parameter of the operating stick so as to calculate a line velocity vector of collision point. As shown in FIG. 5E, it is assumed that a coordinate sampling time of detecting a collision is Tn, and the coordinate amount/number of saving motion trajectory as set is m, when calculating the vector of momentum, a suitable sampling point in the points of Tn–1, Tn–2, . . . , Tn–m is determined according to an application scene of the stereo interactive operating stick and for calculating the momentum.

If an interval of sampling point is too short, a random error on sampled coordinate may lead to the final result inaccurate; and if the interval is too long, the calculated result may not meet the real situation at the end time of collision. Generally, a time interval for calculating the momentum is suitable in the range of 200~500 ms.

After the sampling position for calculating the momentum is determined, a vector matrix is obtained by spatial coordinates of two collision points, a direction of the vector is the collision direction, and a line velocity of collision points is the derivative of a modulus of the vector to the sampling interval. The momentum is the product of multiplying the line velocity with the preset mass of the stereo interactive operating stick, and the product then is sent to the interaction logic unit 208.

The interaction logic unit 208 calculates current operation type information as collision type information according to the motion trajectory information from the relative gesture calculating unit 202, the collision momentum information from the invasion degree calculating unit 204 and the property of elastic collision object, and then sends the collision type information to the interaction feedback unit 206. The interaction logic unit 208 further outputs a first control signal (i.e., force feedback intensity control signal) to the force feedback unit 216 of the stereo interactive operating stick according to damping magnitude information, damping duration information and force feedback intensity information, and meanwhile the interaction logic unit 208 simultaneously sends a second control signal to the display unit for displaying the change effect of the virtual object being collided.

When a collision being visually outside the screen occurs, a processing process of the stereo interactive display device according to the preset invention is similar to that of the collision being visually inside the screen, a difference is that: the elastic collision being visually outside the screen does not need to consider the damping magnitude information and damping duration, i.e., the damping generation unit 218 of the stereo interactive operating stick is no action, and will not be described in detail herein.

In brief, if the elastic collision being visually outside the screen occurs, the telescopic section of the stereo interactive operating stick would not telescope. At this time only the force feedback unit 216 of the stereo interactive operating stick performs an action. When the collision occurs, the interaction logic unit 208 would send a force feedback intensity control signal to the stereo interactive operating stick according to intensity of the collision. The larger the collision intensity, the larger the intensity of the force feedback, vice versa.

Accordingly, when the stereo interactive operating stick moves outside the screen, if it collides with a virtual object being visually outside the screen, a collision process would be displayed according to a motion velocity of the stereo interactive operating stick and preset mass of the virtual object. If the virtual object is collided into a parallax being visually inside the screen, the display part would carry out a corresponding conversion. During the collision, the force feedback unit 216 of the stereo interactive operating stick will provide the user a corresponding force feedback, and thereby the reality of the collision is improved.

Figure 5A:
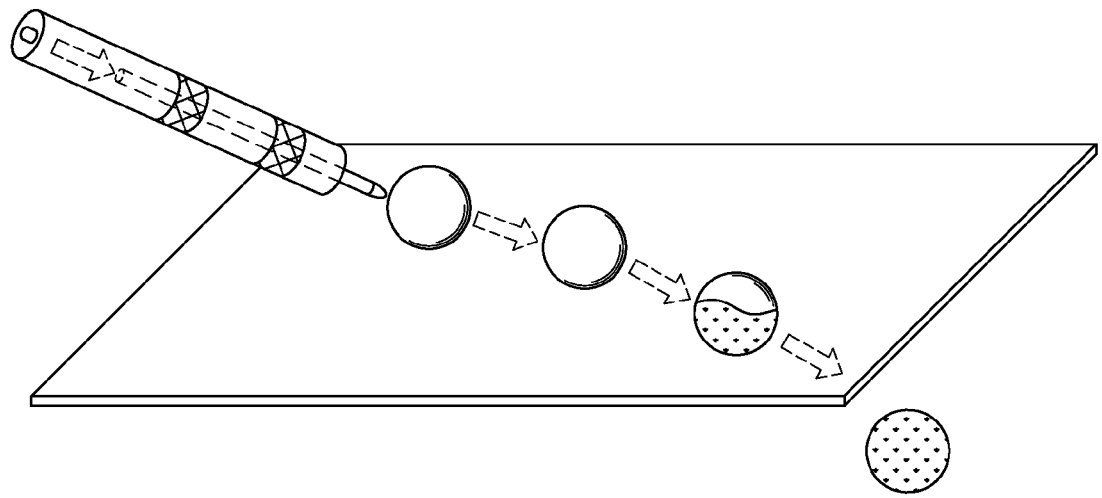
FIGS. 5A and 5B are schematic views showing that a stereo interactive operating stick collides with a virtual object being visually outside the screen with different motion velocities according to an embodiment of the present invention.
Figure 5B:
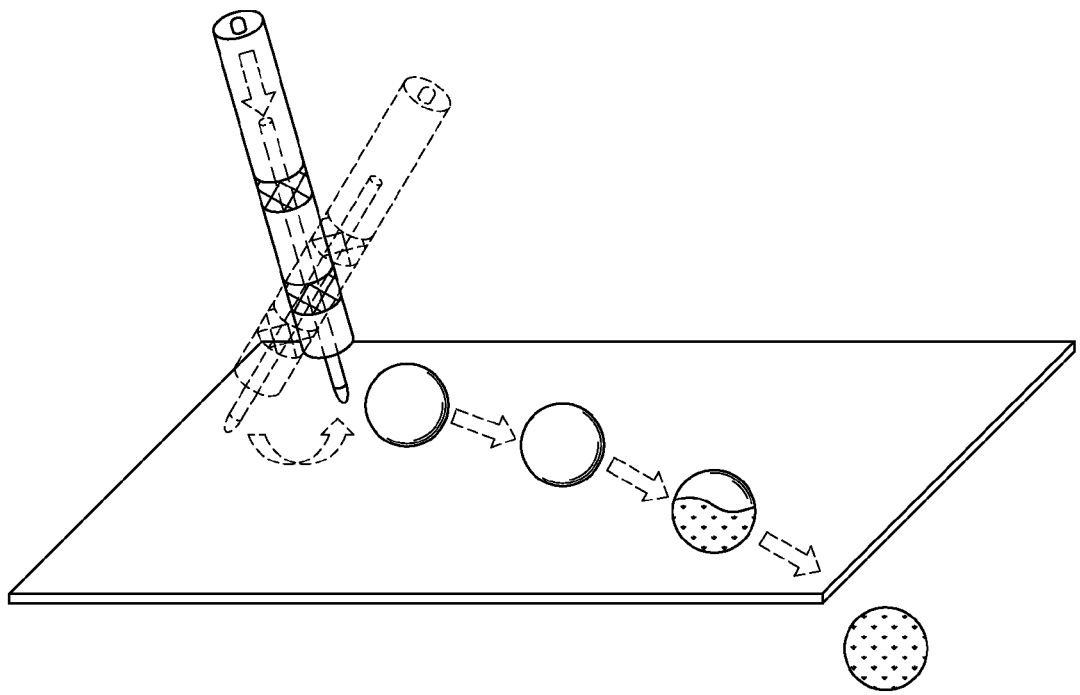

As shown in FIGS. 5A and 5B, a motion velocity of the stereo interactive operating stick in FIG. 5A is smaller than the motion velocity of the stereo interactive operating stick in FIG. 5B, in the situation, although the virtual object remains unchanged, the force feedbacks provided to the operator by the force feedback unit 216 of the stereo interactive operating stick are different.

If the elastic collision being visually inside the screen occurs, when the user operates the telescopic section of the stereo interactive operating stick to contact with the screen and to continue to extend into the screen, the telescopic section of the stereo interactive operating stick would retract. At this time, an extending portion of the stereo interactive operating stick is displayed according to obtained gesture and position of the stereo interactive operating stick and the telescopic degree of the telescopic section.

When the stereo interactive operating stick moves inside the screen, if it collides with a virtual object being visually inside the screen, a collision occurs and the collision process is displayed according to a motion velocity of the telescopic section of the stereo interactive operating stick and preset mass of the virtual object. After the collision, if the object crosses the boundary to be in a parallax being visually outside the screen, the display part would carry out the corresponding conversion. During the collision, the force feedback unit 216 of the stereo interactive operating stick will give a corresponding force feedback to the operator and the damping generation unit 218 will generate a rigid damping, and thereby the reality of the collision is improved.

Figure 5C:
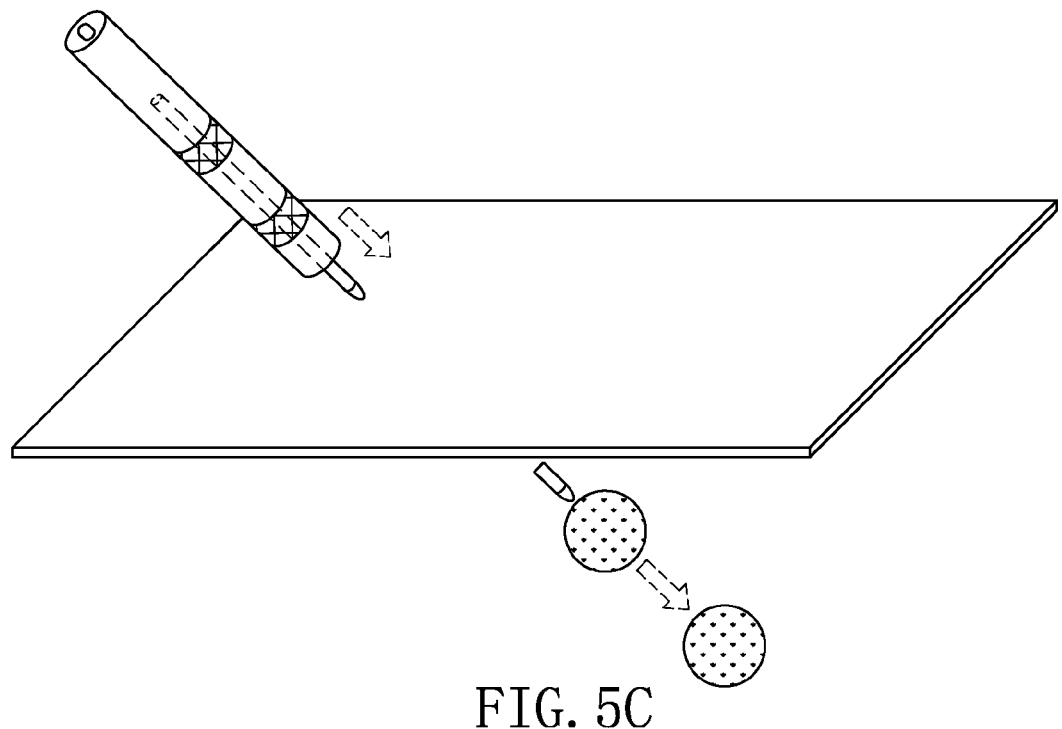
FIGS. 5C and 5D are schematic views showing that a stereo interactive operating stick collides with a virtual object being visually inside the screen with different motion velocities according to an embodiment of the present invention.
Figure 5D:
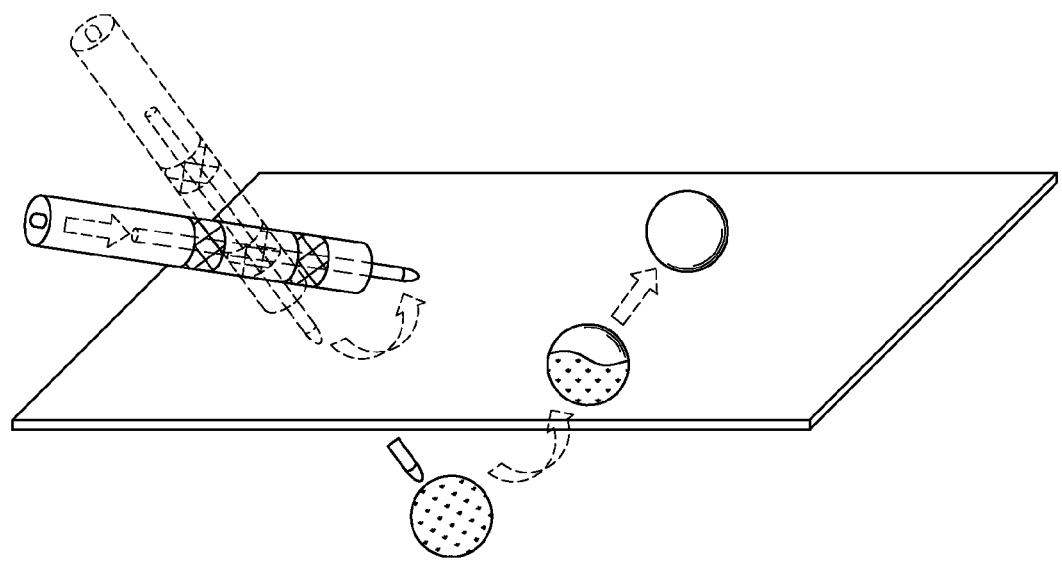
Figure 5E:
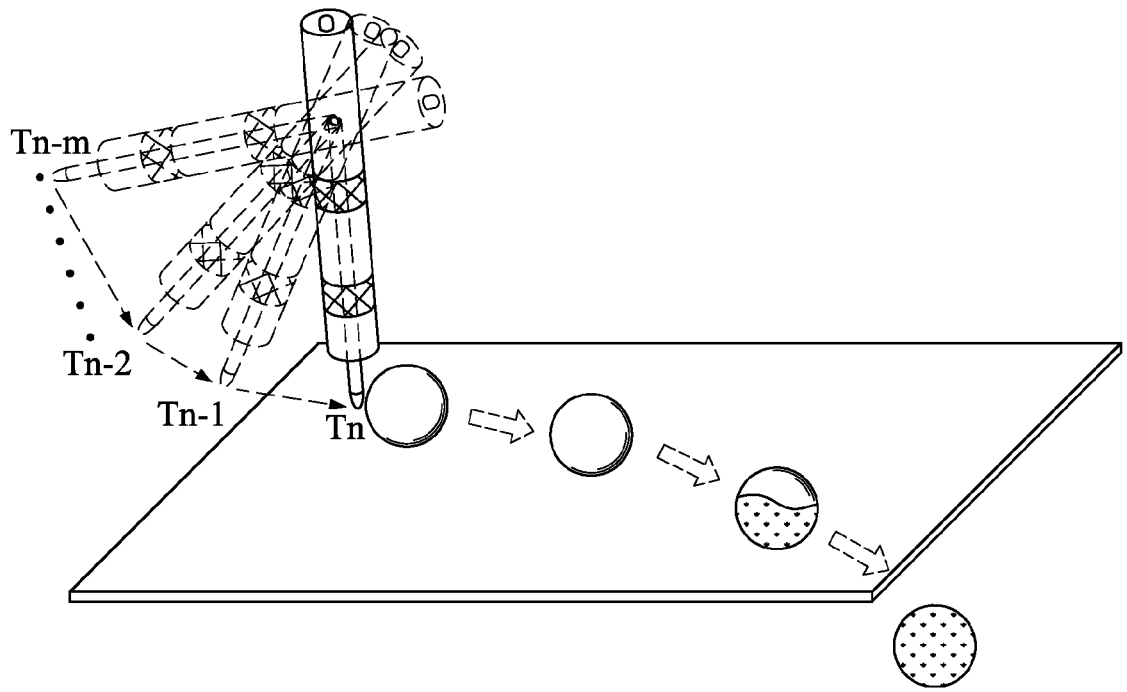
FIG. 5E is a schematic view of a stereo interactive operating stick collides with a virtual object being visually outside the screen according to an embodiment of the present invention.

As shown in FIGS. 5C and 5D, the motion velocity of the stereo interactive operating stick in FIG. 5C is smaller than the motion velocity of the stereo interactive operating stick in FIG. 5D, in this situation, although the virtual object remains unchanged, force feedbacks provided to the operator by the force feedback unit 216 of the stereo interactive operating stick are different.

A third typical scene is that a destructive type of interaction occurs between a stereo interactive operating stick and a virtual object.

The destructive type of interaction between the stereo interactive operating stick and a virtual object being visually outside the screen is given in detail as follows.

When the stereo interactive operating stick performs an invasion type of contact with a destructible virtual object being visually outside the screen, the virtual object will be destroyed as the stereo interactive operating stick moves in the space outside the screen, and meanwhile the graphics display of the virtual object will be changed correspondingly.

Figure 6A:
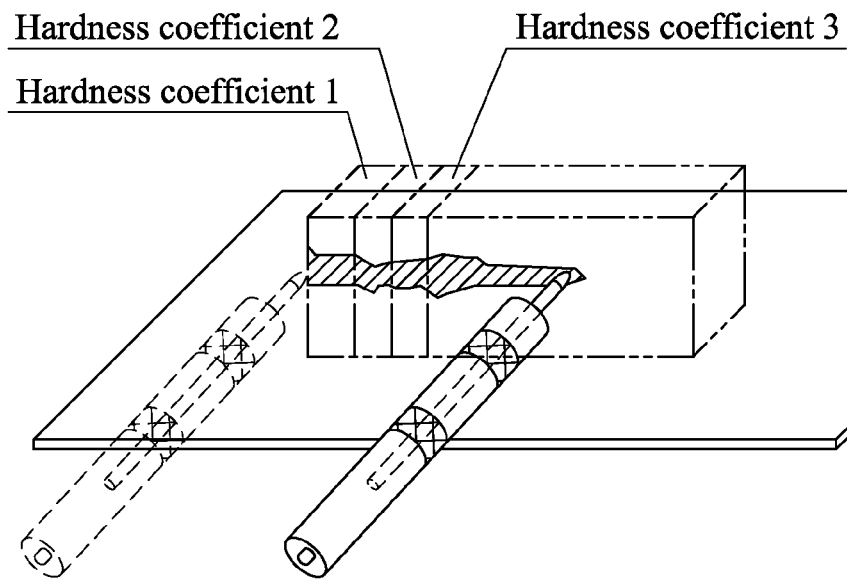
FIG. 6A is a schematic view of a destructive type of interaction of an object being visually outside the screen according to an embodiment of the present invention.

When the stereo interactive operating stick invades into the virtual object, the telescopic section of the stereo interactive operating stick will automatically retract according to the invaded degree, and meanwhile an extending portion of the stereo interactive operating stick will be displayed inside the virtual object, so as to generate the visual effect of the stereo interactive operating stick invading into the object, as shown in FIG. 6A.

The virtual object being visually outside the screen has multiple levels with different preset hardness. During the process that the virtual object is invaded by the stereo interactive operating stick, the force feedback unit combines pressure feedbacks of hardness levels of the virtual object onto the skin to provide tactile impression of different hardness.

An invasion destructive type of interaction between the stereo interactive operating stick and a virtual object being visually inside the screen is given in detail as follows.

When the stereo interactive operating stick performs an invasion type of contact with a destructible virtual object being visually inside the screen, the telescopic device of the stereo interactive operating stick will retract. The virtual object would be destroyed as the stereo interactive operating stick moves in the space inside the screen, and meanwhile the graphics display of the virtual object will be changed correspondingly.

Figure 6B:
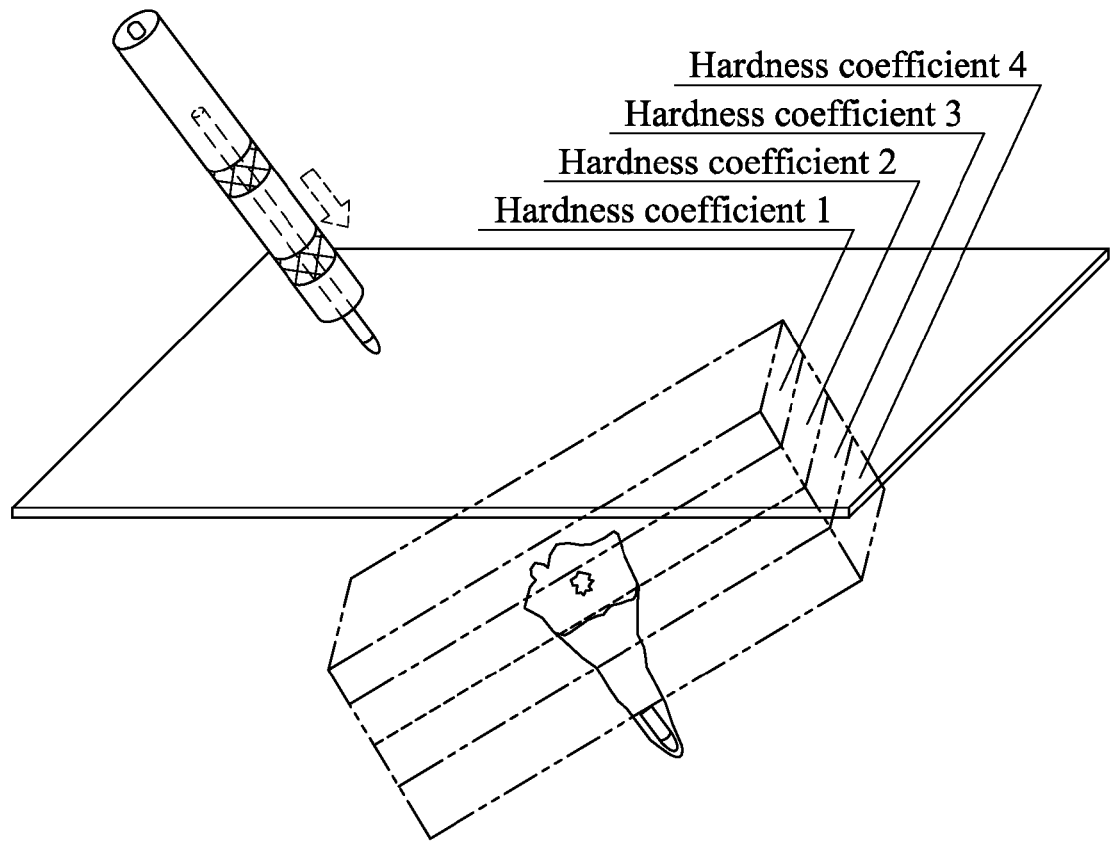
FIGS. 6B and 6C are schematic views of destructive type of interactions of an object visually inside the screen according to an embodiment of the present invention.

When the stereo interactive operating stick invades into the virtual object, an extending portion of the stereo interactive operating stick will be displayed inside the virtual object so as to generate the visual effect of the stereo interactive operating stick invading into the object, as shown in FIG. 6B.

The virtual object being visually inside the screen has multiple levels with different preset hardness. During the process that the virtual object is invaded by the stereo interactive operating stick, the damping generation unit of the telescopic section of the stereo interactive operating stick will provide corresponding damping to a retraction action according to preset hardness levels of the virtual object, so as to generate tactile impression of different hardness. Meanwhile, the force feedback unit of the stereo interactive operating unit would perform an operation simultaneously to generate corresponding pressure feedback onto the skin, so as to improve the reality of operation.

A good example is that when the stereo interactive operating stick as a virtual scalpel is used to perform a virtual surgery, such as cut skin, fat layer, skeleton and internal organs, damping or force feedback felt by the operator would be changed according to actual layer, and the picture/image also changes correspondingly.

In the above third typical scene, the preset property of the virtual object is an object with multi-level hardness. The operation type information determined by the interaction logic unit 208 is invasion destructive type information. The invasion degree calculating unit 204 calculates a length that the stereo interactive operating stick invades into the virtual object (hereinafter as "invaded length") according to motion trajectory information of the stereo interactive operating stick from the relative gesture calculating unit 202. The invaded length is compared with relative positions of preset hardness levels of the virtual object, and the currently-invaded level is labeled to generate labeling information. In this embodiment, the invasion degree information is the labeling information. The invasion degree calculating unit 204 sends the labeling information to the interaction feedback unit 206 and the interaction logic unit 208.

It is indicated that, a telescopic degree measurement unit 220 in FIG. 2 can assist obtaining an invasion degree of the stereo interactive operating stick inside the screen, i.e., using a telescopic degree of the stereo interactive operating stick obtained by the telescopic degree measurement unit 220 as gesture information of the stereo interactive operating stick so as to determine the motion trajectory of the stereo interactive operating stick, which can avoid complex coordinate calculation and can be applied to squeezing interaction which does not require gesture judgment without performing gesture calculation.

The interaction logic unit 208 determines current operating type information (invasion destructive type information in this embodiment) of the stereo interactive operating stick according to the labeling information, the motion trajectory information of the stereo interactive operating stick and the preset property of the virtual object (object with multi-level hardness and can be invaded in this embodiment), and informs the determined operation type information to the interaction feedback unit 206.

The interaction feedback information in the third scene is total damping force information corresponding to the invaded length represented by current labeling information calculated by the interaction feedback unit 206 according to corresponding relationships between preset hardness of respective levels and damping forces. The interaction feedback unit 206 sends the total damping force information to the interaction logic unit 208. The interaction logic unit 208 sends a first control signal (damping force control signal and force feedback intensity control signal) to the stereo interactive operating stick according to total damping force information calculated by the interaction feedback unit 206, and meanwhile the interaction logic unit 208 sends a second control signal to the display unit to make the displayed virtual object to be changed correspondingly, e.g., an image change of being cut.

It is indicated that, invasion levels labeled by the invasion degree calculating unit 204 are classified into two types: being invaded and been penetrated.

Since in reality, the penetrated object still has a damping effect to the object invading therein. Based on this situation, each level of the virtual object has a preset thickness $TN_x$ which has a being-invaded damping coefficient $KIN_x$ and a penetration damping coefficient $KFIN_x$, wherein x is the number of level. These damping coefficients are obtained by actual measurement of the designer according to actual scene or predesigned according to the characteristics of the virtual object.

Figure 6C:
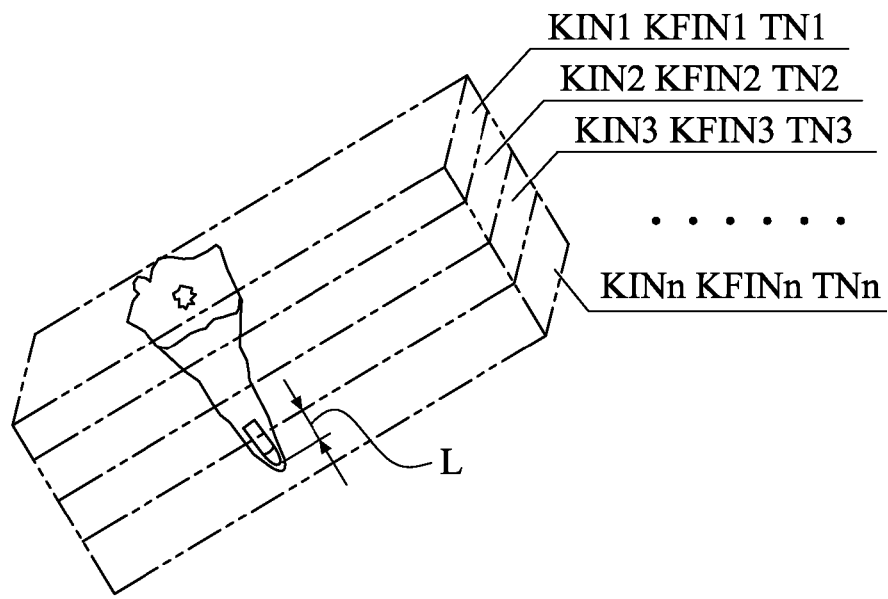

As shown in FIG. 6C, it is assumed that the currently-being-invaded level is n, and an invaded depth of the level n is L, the following expressions are satisfied:

a penetration damping force of a level x which has been penetrated is $FFIN_x = KFIN_x \times TN_x$;

a damping force of a level x being invaded is $FIN_x = KFIN_x \times L + KIN_x \times (TN_x - L)$; and a total damping force Fall is that $Fall = KFIN_1 \times TN_1 + KFIN_2 \times TN_2 + \ldots + KFIN_{(n-1)} \times TN_{(n-1)} + KFIN_n \times L + KIN_n \times (TN_n - L)$. After that, the total damping force Fall is sent to the interaction logic unit 208.

Figure 6D:
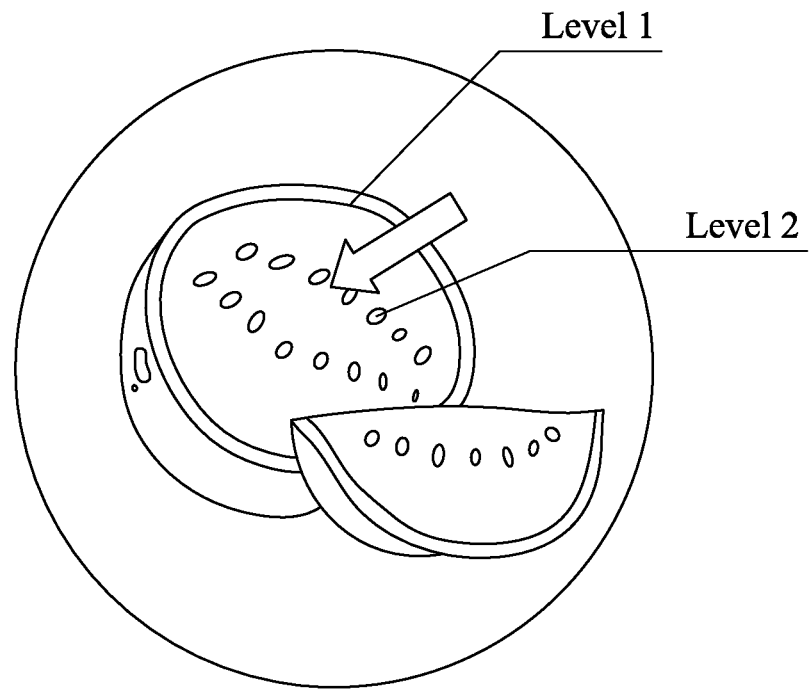
FIG. 6D is a schematic view of a stereo interactive operating stick performing a destructive type of interaction with a virtual object according to another embodiment of the present invention.

The relationship between the above-described invasion degree and damping force essentially is a preset function, and not limited to the above example. The stereo interactive method of the present invention also can be applied to other interactive scenes, for example, when the stereo interactive method of the present invention is used to play the game of "Fruit Ninja" in the three-dimensional space, as shown in FIG. 6D, during the process of using the stereo interactive operating stick to virtually cut watermelon, the telescopic damping and invasion degree of the stereo interactive operating stick satisfy a piecewise function which uses the rind and the flesh of the watermelon as boundaries; and during the process that the virtual knife of the stereo interactive operating stick invades into the two levels of rind and flesh, the telescopic damping and the invasion degree satisfy a continuous function.

The interaction logic unit 208 is configured for processing invaded destructive physical calculation of the virtual object and logic of interaction, converting the calculation result into first control information and second control information, and sends the first control information and the second control information respectively to the stereo interactive operating stick and the display unit. Moreover, the display unit includes a parallax calculating unit 210 and a stereo display driving unit 212.

During processing the situation of invasion destructive type interaction of an object with multi-level hardness, if the virtual object being visually outside the screen is invaded, the telescopic section of the stereo interactive operating stick does not telescope. Thus, a damping feeling cannot be offered to the operator by the damping generation unit. At this time, the point of reflecting the damping represented by the total damping force on the force feedback unit 216 lies in the pressure generated onto the skin, and the damping force is positive proportional to the pressure. Due to the limit of operation principle of existing force feedback unit, components like eccentric motors or artificial muscles cannot provide a continuously increased sense of pressure to the skin, and thus the force feedback unit 215 provides a tactile impression which gives the contact surface of the human skin a sense of pressure by a continuous high-frequency vibration. The amplitude of the high-frequency vibration is positive proportional to the sense of pressure.

The interaction logic unit 208 converts the total damping force Fall sent from the interaction feedback calculating unit 206 into a section of continuous vibration data and sends the vibration data to the stereo interactive operating stick for force feedback. The operation of force feedback occurs only when the stereo interactive operating stick moves inside the invaded object, and thus is consistent with the real situation.

If the virtual object being visually inside the screen is invaded, the interaction logic unit 208 converts the total damping force Fall sent from the interaction feedback calculating unit 206 into a damping control signal which is output to the damping generation unit 218 of the stereo interactive operating stick and a force feedback intensity control signal which is output to the force feedback unit 216 of the stereo interactive operating stick. At this time, the operator will spontaneously feel the hardness of the object because of the operation of the damping generation unit 218.

The interaction logic unit 208 is further configured for processing the graphics change of the virtual object resulting from the invasion destruction, converting the processing result into a second control signal and sending the second control signal to the display unit. The display unit displays the response of the virtual object according to the second control signal.

The functions of other modules of the stereo interactive display device 200B are as follows. The parallax calculating unit 210 is configured for calculating a positive parallax outside the screen of the virtual object after the virtual object performing the interaction logic, and sending the calculating result to the stereo display driving unit 212. The stereo display driving unit 212 is configured for controlling the display of the 3D stereo display 214. The 3D stereo display 214 is configured for displaying all content needed to be displayed such as graphics interface and virtual object.

In the foregoing, the working principle of the stereo interactive display device 200B according to the present invention and the interaction process between the stereo interactive display device 200B and the stereo interactive operating stick 200A are described in detail based on three typical scenes. Since the application scenes are various, and thus other example will not be described herein. By the technical solutions of the present invention, during the process of using the stereo interactive operating stick to interact with a virtual object displayed by the stereo display screen, the user can experience real operation tactile impression, for example can feel the hardness, elasticity of the virtual object.

Figure 7:
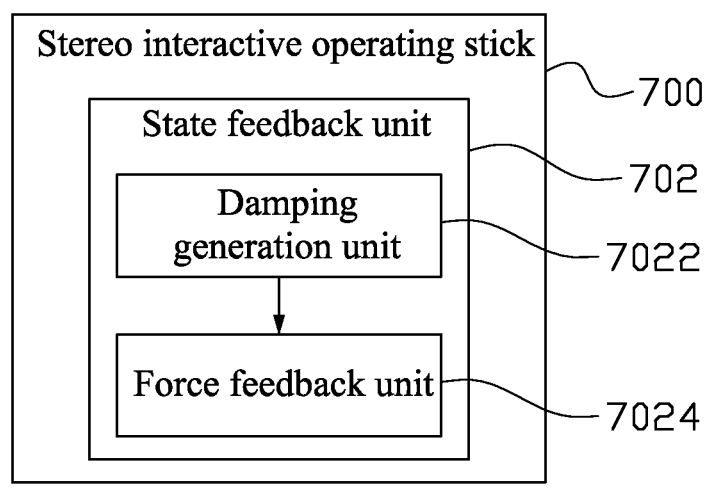
FIG. 7 is a block diagram of a stereo interactive operating stick according to still another embodiment of the present invention.

FIG. 7 is a schematic block diagram of a stereo interactive operating stick according to an embodiment of the present invention.

As shown in FIG. 7, the stereo interactive operating stick 700 according to the embodiment of the present invention further includes a state feedback unit 702. The state feedback unit 702 receives the first control signal from the stereo interactive display device of any one of the above technical solutions. The stereo interactive operating stick makes a response matched with the preset property of the virtual object according to the received first control signal.

The state of the stereo interactive operating stick changes according to practical operation process and property of the virtual object, so that the user holding the stereo interactive operating stick at hand can experience a corresponding operation state and obtain real tactile impression, and thereby the operation experience is improved.

In the above technical solution, preferably, the state feedback unit 702 includes but not limited to a damping generation unit 7022 and a force feedback unit 7024. The damping generation unit 7022 is configured for generating a damping force according to the first control signal. The force feedback unit 7024 is configured for generating a vibration with corresponding amplitude according to the first control signal.

Furthermore, the present invention also provides a stereo interactive system including: the stereo interactive operating stick 700 of any one of the above technical solutions, and the stereo interactive display device 200B of any one of the above technical solutions. It is indicated that, the stereo interactive operating stick 700 can data communicate with the stereo interactive display device 200B by a wireless communication manner. The wireless communication manner can be but not limited to WIFI, Bluetooth, infrared, and NFC (Near Field Communication).

In the foregoing, the technical solutions of the present invention are described in detail with reference to accompanying drawings, during using the stereo interactive operating stick to squeeze an elastic virtual object with certain hardness, the operator handholding the stereo interactive operating stick can get a real harness experience. During using the stereo interactive operating stick to collide with a virtual object, the operator handholding the stereo interactive operating stick can get a rigid collision experience. During using the stereo interactive operating stick to perform an invasive destruction to a virtual object, tactile impression of objects with different hardness and complex invasive object destructive interaction with variable tactile impression can be achieved. Gesture recognition, tactile impression generated during interacting with a virtual object with preset property and a corresponding response simultaneously made by the virtual object in response to the operation of the stereo interactive operating stick are involved into the stereo interaction, and therefore is a "real stereo" interaction.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A stereo interactive method adapted for an interactive scene of a stereo display device and a stereo interactive operating stick, comprising:
    obtaining motion trajectory information of the stereo interactive operating stick;
    calculating invasion degree information of an invasion that the stereo interactive operating stick applies to a virtual object displayed by the display device according to the motion trajectory information and preset property information of the virtual object;
    calculating interaction feedback information according to the motion trajectory information, the invasion degree information and the preset property information; and
    controlling the stereo interactive operating stick and the virtual object to make responses matched with the preset property of the virtual object according to the interaction feedback information; wherein
    the step of obtaining motion trajectory information of the stereo interactive operating stick comprises: obtaining the motion trajectory information of the stereo interactive operating stick according to information of a triggered button on the stereo interactive operating stick and gesture information of the stereo interactive operating stick;
    the step of calculating interaction feedback information according to the motion trajectory information, the invasion degree information and the preset property information comprises: determining operation type information of an operation that the stereo interactive operating stick performs to the virtual object according to the invasion degree information, the motion trajectory information and the preset property information, and calculating the interaction feedback information according to the operation type information and the invasion degree information; and
    the step of controlling the stereo interactive operating stick and the virtual object to make responses matched with the preset property of the virtual object according to the interaction feedback information comprises: controlling the stereo interactive operating stick to make the response matched with the operation type and the preset property of the virtual object according to the interaction feedback information.

2. The stereo interactive method as claimed in claim 1, wherein when the preset property of the virtual object is an elastic object with certain hardness, the invasion degree information is squeezing degree information of the virtual object being squeezed, the operation type information is squeezing type information;
    the interaction feedback information calculated according to the squeezing degree information and the squeezing type information comprises damping force information and/or force feedback intensity information;
    when the squeezed virtual object is a virtual object being visually outside the screen, the force feedback intensity information is converted into a force feedback intensity control signal which is output to the stereo interactive operating stick to thereby control the stereo interactive operating stick to make a response matched with the operation type and the preset property of the virtual object; or
    when the squeezed virtual object is a virtual object being visually inside the screen, the damping force information and the force feedback intensity information respectively are converted into a damping force control signal which is output to the stereo interactive operating stick and a force feedback intensity control signal which is output to the stereo interactive operating stick, to thereby control the stereo interactive operating stick to make a response matched with the operation type and the preset property of the virtual object.

3. The stereo interactive method as claimed in claim 2, wherein the virtual object makes a response matched with the operation type and the preset property of the virtual object.

4. The stereo interactive method as claimed in claim 1, wherein when the preset property of the virtual object is an elastic object with possible elastic collision, the invasion degree information is collision momentum information of the virtual object, and the operation type information is collision type information;
    when a collision being visually outside the screen occurs, the interaction feedback information comprises force feedback intensity information and force feedback duration information calculated according to the collision momentum information and preset mass and hardness of the virtual object, the interaction feedback information is converted into a force feedback intensity control signal which is output to the stereo interactive operating stick to thereby control the stereo interactive operating stick to make a response matched with the operation type and the preset property of the virtual object;
    when a collision being visually inside the screen occurs, the interaction feedback information comprises damping magnitude information, damping duration information and force feedback intensity information calculated according to the collision momentum information and preset mass and hardness of the virtual object, the interaction feedback information is converted into a damping force control signal which is output to the stereo interactive operating stick and a force feedback intensity control signal which is output to the stereo interactive operating stick to thereby control the stereo interactive operating stick to make a response matched with the operation type and the preset property of the virtual object.

5. The stereo interactive method as claimed in claim 4, wherein the virtual object makes a response matched with the operation type and the preset property of the virtual object.

6. The stereo interactive method as claimed in claim 1, wherein when the preset property of the virtual object is an object with multi-level hardness, the invasion degree information is an invaded destructive length of the virtual object, and the operation type information is invasion destructive type information;

the interaction feedback information comprises total damping force information corresponding to a current invaded length calculated according to corresponding relationships between preset hardness of each level and damping force;

when the invaded virtual object is an object being visually outside the screen, the total damping force information is converted into force feedback intensity information and force feedback duration information, and a force feedback intensity control signal is output to the stereo interactive operating stick to thereby control the stereo interactive operating stick to make a response matched with the operation type and the preset property of the virtual object; and when the invaded virtual object is an object being visually inside the screen, a damping force control signal and a force feedback intensity control signal are output to the stereo interactive operating stick according to the total damping force information, to thereby control the stereo interactive operating stick to make a response matched with the operation type and the preset property of the virtual object.

7. The stereo interactive method as claimed in claim 6, wherein the virtual object makes a response matched with the operation type and the preset property of the virtual object.

8. The stereo interactive method as claimed in claim 1, wherein the stereo interactive operating stick has a preset property, the virtual object makes a response matched with the preset property of the stereo interactive operating stick as well as the preset property of the virtual object according to the interaction feedback information and the preset property of the stereo interactive operating stick.

9. A stereo interactive display device adapted for interacting with a stereo interactive operating stick capable of generating information of triggered button and gesture information, comprising:
a display unit, configured to display a virtual object with preset property in a three-dimensional manner, wherein the display unit comprises a stereo display driving circuit and a 3D stereo display; and
wherein the stereo interactive display device is interactive with the stereo interactive operating stick and configured to obtain motion trajectory information of the stereo interactive operating stick, calculate invasion degree information of an invasion that the stereo interactive operating stick applies to the virtual object according to the motion trajectory information and preset property information of the virtual object, calculate interaction feedback information according to the motion trajectory information, the invasion degree information and the preset property information, and send a first control signal and a second control signal to the stereo interactive operating stick and the display unit respectively according to the interaction feedback information; the stereo interactive operating stick makes a response matched with the preset property of the virtual object after receiving the first control signal, and the display unit displays the virtual object being made a response matched with the preset property of the virtual object after receiving the second control signal;
wherein the stereo interactive display device specifically is:
configured to receive the information of triggered button and the gesture information of the stereo interactive operating stick, and calculate the motion trajectory information of the stereo interactive operating stick according to the information of triggered button and the gesture information;
configured to calculate the invasion degree information according to the motion trajectory information and the preset property information of the virtual object;
configured to calculate the interaction feedback information according to operation type information and the invasion degree information; and
configured to determine the operation type information of an operation that the stereo interactive operating stick performs to the virtual object according to the invasion degree information, the motion trajectory information and the preset property information of the virtual object, and generate the first control signal and the second control signal according to the interaction feedback information.

10. The stereo interactive display device as claimed in claim 9, wherein when the preset property of the virtual object is an elastic object with certain hardness, the invasion degree information is squeezing degree information of the virtual object being squeezed, the operation type information is squeezing type information;
when the squeezed virtual object is a virtual object being visually outside the screen, the interaction feedback information calculated according to the squeezing degree information and the squeezing type information is force feedback intensity information; and when the squeezed virtual object is a virtual object being visually inside the screen, the interaction feedback information calculated according to the squeezing degree information and the squeezing type information comprises damping force information and force feedback intensity information;
when the squeezed virtual object is the virtual object being visually outside the screen, the first control signal is a force feedback intensity control signal which is converted from the force feedback intensity information and output to the stereo interactive operating stick, and the force feedback intensity control signal is to control the stereo interactive operating stick to make a response matched with the operation type and the preset property of the virtual object;
when the squeezed virtual object is the virtual object being visually inside the screen, the first control signal comprises a damping force control signal which is converted from the damping force information and output to the stereo interactive operating stick and a force feedback intensity control signal which is converted from the force feedback intensity information and output to the stereo interactive operating stick, to thereby control the stereo interactive operating stick to make a response matched with the operation type and the preset property of the virtual object;
wherein the stereo interactive operating stick is configured to produce a vibration with corresponding amplitude according to the force feedback intensity control signal and configured to produce a damping force according to the damping force control signal.

11. The stereo interactive display device as claimed in claim 10, wherein the display unit controls the virtual object to make a response matched with the operation type and the preset property of the virtual object according to the second control signal.

12. The stereo interactive display device as claimed in claim 9, wherein when the preset property of the virtual object is an elastic object with possible elastic collision, the invasion degree information is collision momentum information of the virtual object, the operation type information is collision type information;

the collision momentum information at a collision position of the stereo interactive operating stick with the virtual object is calculated, when a collision being visually outside the screen occurs, the interaction feedback information calculated according to the collision momentum information and preset mass and hardness of the virtual object comprises force feedback intensity information and force feedback duration information; or when a collision being visually inside the screen occurs, the interaction feedback information calculated according to the collision momentum information and preset mass and hardness of the virtual object comprises damping magnitude information, damping duration information and force feedback intensity information;

when the collision being visually outside the screen occurs, the first control signal is a force feedback intensity control signal which is output to the stereo interactive operating stick according to the force feedback intensity information and the force feedback duration information; or when the collision being visually inside the screen occurs, the first control signal comprises a damping force control signal which is output to the stereo interactive operating stick and a force feedback intensity control signal which is output to the stereo interactive operating stick according to the damping magnitude information, the damping duration information and the force feedback intensity information;

wherein the stereo interactive operating stick is configured to produce a vibration with corresponding amplitude according to the force feedback intensity control signal and configured to produce a damping force according to the damping force control signal.

13. The stereo interactive display device as claimed in claim 12, wherein the display unit controls the virtual object to make a response matched with the operation type and the preset property of the virtual object according to the second control signal.

14. The stereo interactive display device as claimed in claim 9, wherein when the preset property of the virtual object is an object with multi-level hardness, the invasion degree information is an invaded destructive length of the virtual object, the operation type information is invasion destructive type information;

total damping force information corresponding to a current invaded length is calculated according to corresponding relationships between preset hardness of each level and damping force, and the total damping force information is the interaction feedback information;

when the invaded virtual object is an object being visually outside the screen, the first control signal is a force feedback intensity control signal which is output to the stereo interactive operating stick after converting the total damping force information into force feedback intensity information and force feedback duration information;

when the invaded virtual object is an object being visually inside the screen, the first control signal comprises a damping force control signal which is output to the stereo interactive operating stick and a force feedback intensity control signal which is output to the stereo interactive operating stick according to the total damping force information;

wherein the stereo interactive operating stick is configured to produce a vibration with corresponding amplitude according to the force feedback intensity control signal and configured to produce a damping force according to the damping force control signal.

15. The stereo interactive display device as claimed in claim 14, wherein the display unit controls the virtual object to make a response matched with the operation type and the preset property of the virtual object according to the second control signal.

16. A stereo interactive operating stick configured for receiving the first control signal from the stereo interactive display device as claimed in claim 9;

wherein the stereo interactive operating stick makes a response matched with the preset property of the virtual object according to received first control signal.

17. The stereo interactive operating stick as claimed in claim 16, wherein the stereo interactive operating stick specifically is:

configured for producing a damping force according to the first control signal; and configured for producing a vibration with corresponding amplitude according to the first control signal.

18. A stereo interactive system comprising:

the stereo interactive display device as claimed in claim 9; and a stereo interactive operating stick, configured to receive the first control signal from the stereo interactive display device and thereby the stereo interactive operating stick makes a response matched with the preset property of the virtual object according to the received first control signal.

* * * * *